United States Patent [19]
Keck et al.

[11] Patent Number: 5,730,579
[45] Date of Patent: Mar. 24, 1998

[54] BUNDLE FEED APPARATUS FOR DELIVERING MULTIPLE BUNDLES TO A LOAD FORMER

[75] Inventors: Joshua N. Keck, Nine Mile Falls; Steve Corrales, Spokane, both of Wash.

[73] Assignee: Thermoguard Equipment, Inc., Spokane, Wash.

[21] Appl. No.: 785,412

[22] Filed: Jan. 23, 1997

[51] Int. Cl.$^6$ ..................................................... B65G 57/22
[52] U.S. Cl. ..................... 414/791.6; 414/789.6; 414/791.8; 414/794.7; 414/799; 414/922; 198/346; 198/370.07; 198/615; 198/890
[58] Field of Search .................. 414/789.1, 789.6, 414/791.6, 791.8, 793.4, 794.3, 794.7, 799, 422; 198/346, 357, 370.07, 418.2, 448, 615, 890

[56] References Cited

U.S. PATENT DOCUMENTS

| | | | |
|---|---|---|---|
| 35,066 | 10/1862 | Martin | 414/799 |
| 3,164,080 | 1/1965 | Miller, Jr. | 100/35 |
| 3,245,557 | 4/1966 | Maramonte et al. | 214/6 |
| 3,433,372 | 3/1969 | Galloway | 214/6 |
| 3,515,254 | 6/1970 | Gary | 198/370.07 |
| 3,608,746 | 9/1971 | Meyer | 414/789.6 |
| 3,782,562 | 1/1974 | Burt et al. | 414/789.6 |
| 4,026,422 | 5/1977 | Leenards | 214/6 |
| 4,155,467 | 5/1979 | Lingl | 414/922 |
| 4,260,309 | 4/1981 | Lynn | 414/46 |
| 4,271,755 | 6/1981 | Kintgen et al. | 100/52 |
| 4,371,076 | 2/1983 | Nakao | 198/418.2 |
| 4,976,584 | 12/1990 | Focke | 414/789.6 |
| 5,372,472 | 12/1994 | Winski et al. | 414/789.6 |
| 5,540,545 | 7/1996 | Roberts et al. | 414/789.6 |

FOREIGN PATENT DOCUMENTS

| | | | |
|---|---|---|---|
| 511529 | 11/1992 | European Pat. Off. | 414/789.6 |
| 1122308 | 9/1956 | France | 414/789.6 |
| 155122 | 12/1981 | Japan . | |

OTHER PUBLICATIONS

The Palletizer by Greer.

Primary Examiner—Karen B. Merritt
Assistant Examiner—Douglas A. Hess
Attorney, Agent, or Firm—Wells, St. John, Roberts, Gregory & Matkin P.S.

[57] ABSTRACT

A load forming apparatus is described for forming a load comprised of layers of bundles, in which first and second conveyors are configured to deliver individual first bundles of load components to individual respective first and second transfer stations. A load former operatively joins the conveyor transfer stations. A transfer device adjacent the transfer stations is alternatively operable to (a) move the first bundles from the first transfer station to the load former to form a load comprised of first bundles; (b) move the second bundles from the second transfer station to the load former to form a load comprised of second bundles; or (c) alternate moving the first and second bundles from the first and second transfer stations to the load former to form a load comprised of first and second bundles. A load former feed system is also described in which the bundle transfer station and bundle transfer device are selectively separable to form a manual operator station. A manual transfer table section adjacent the manual operator station is selectively positioned to receive successive bundles from the conveyor and permits manual shifting of bundles to the load forming station.

16 Claims, 19 Drawing Sheets

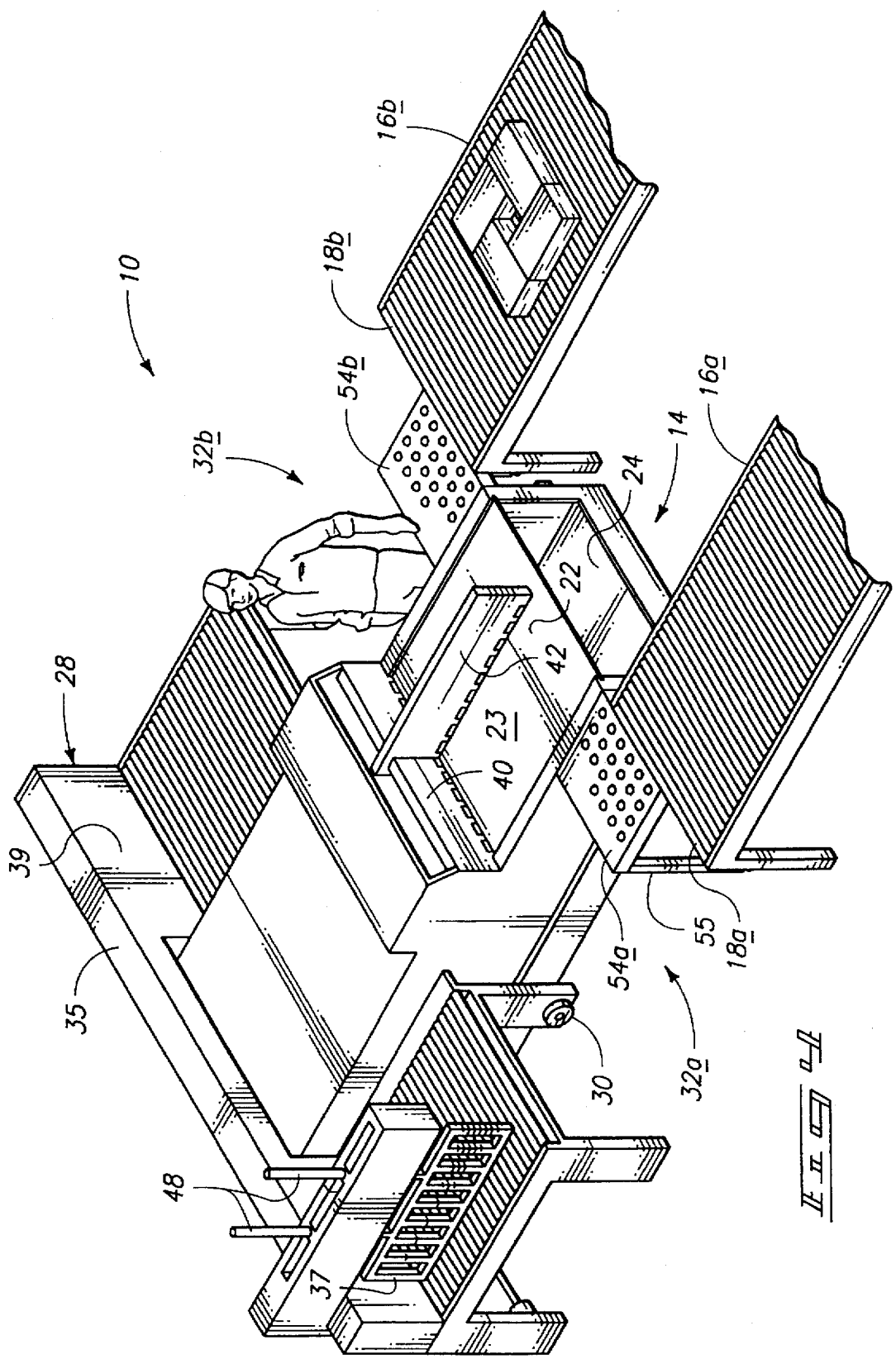

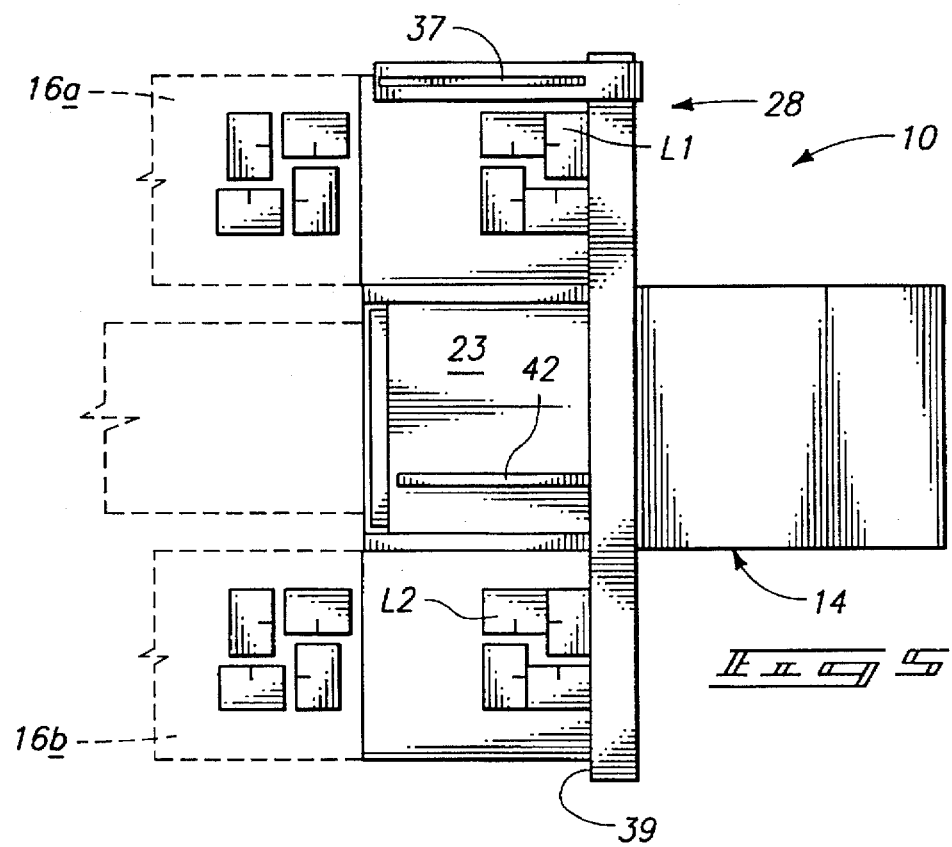
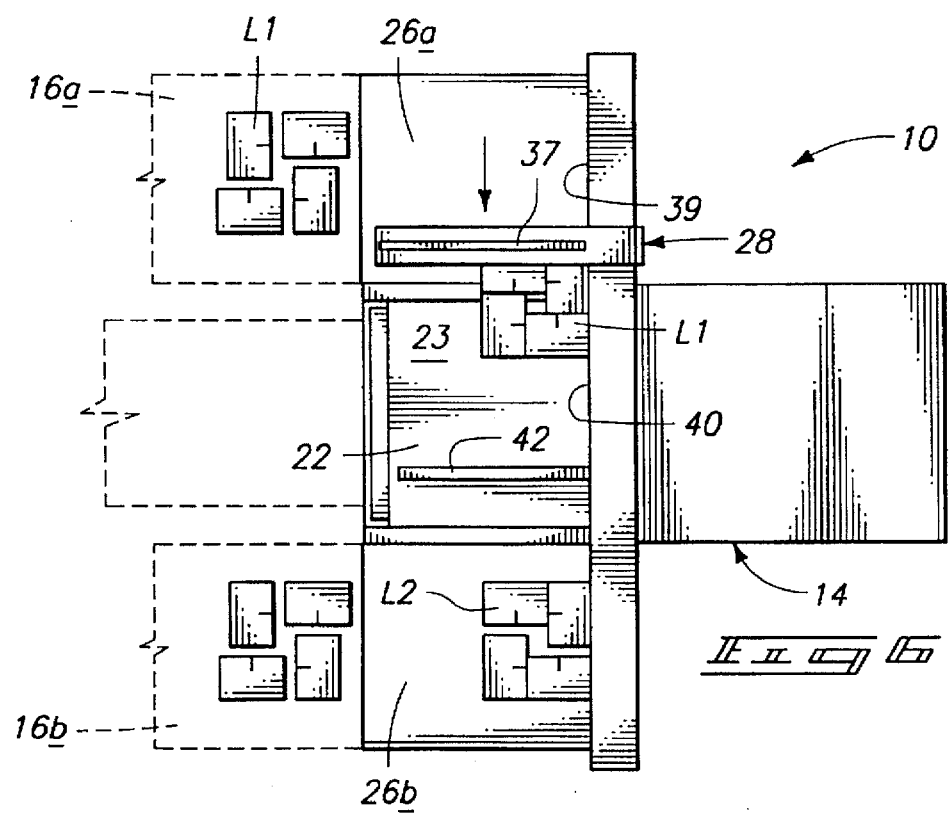

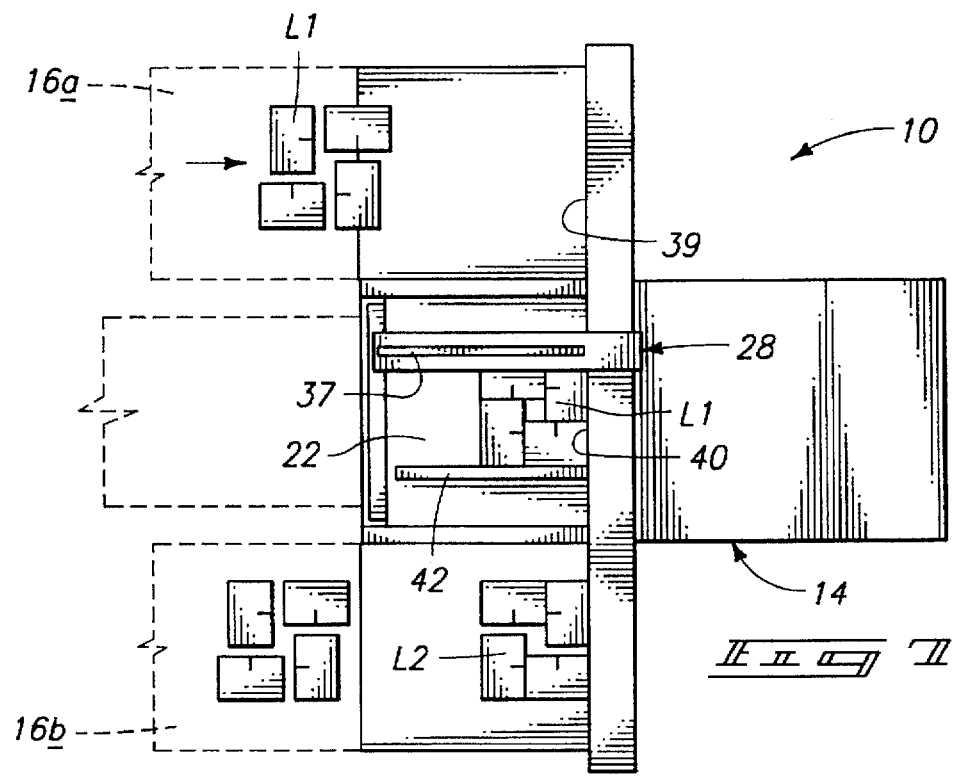
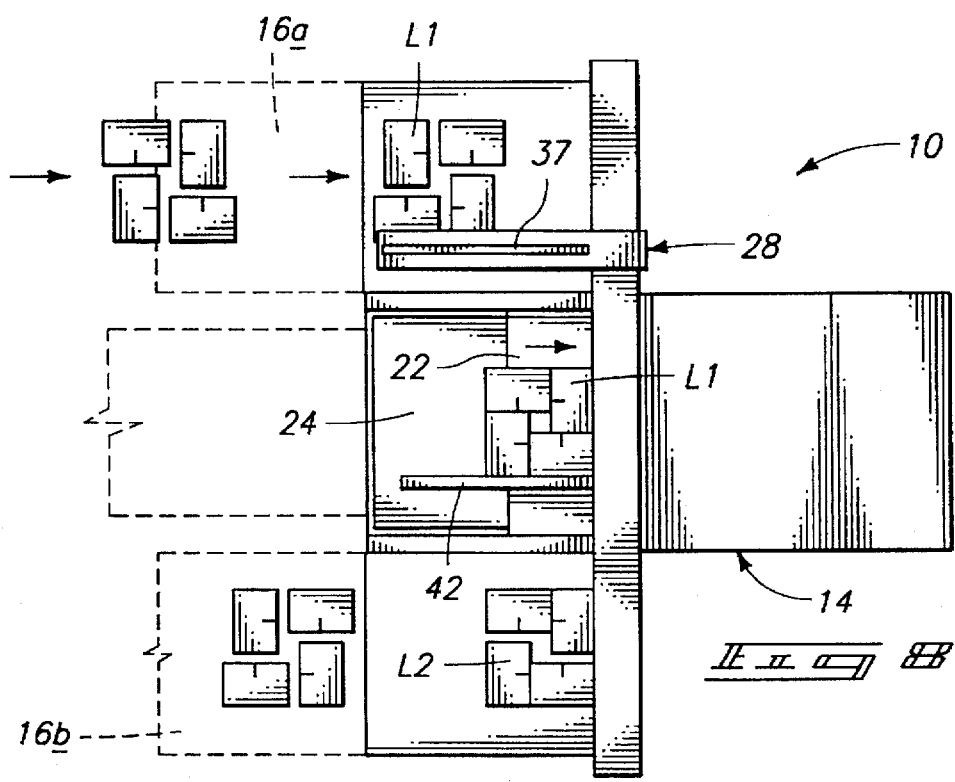

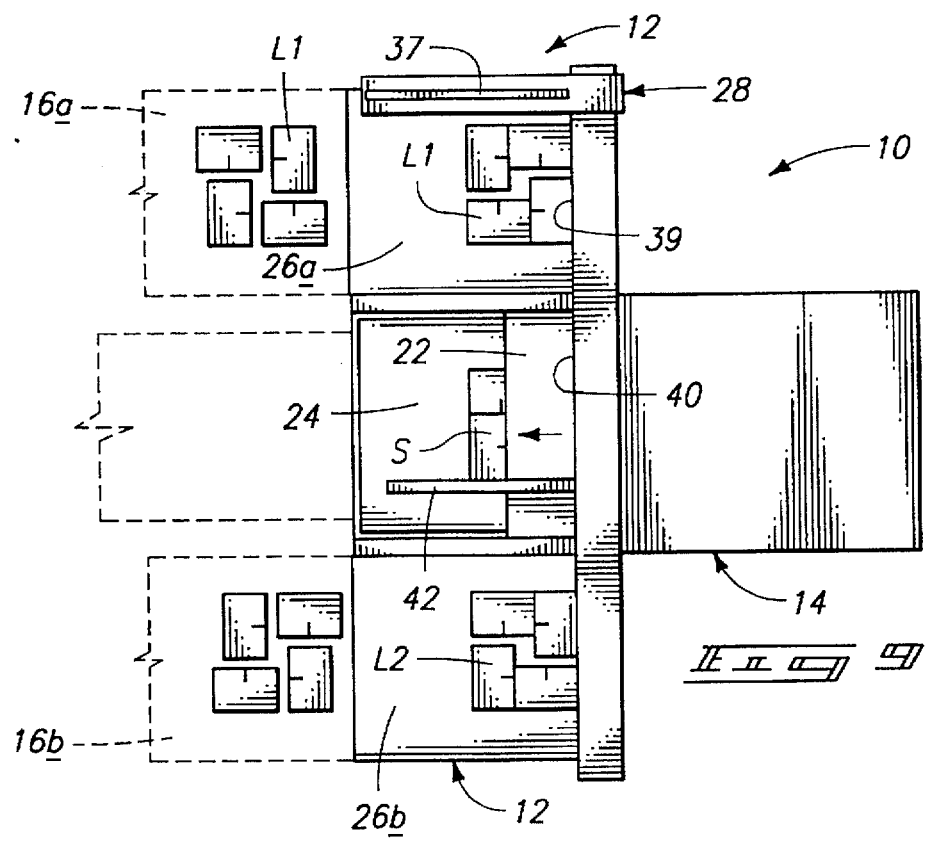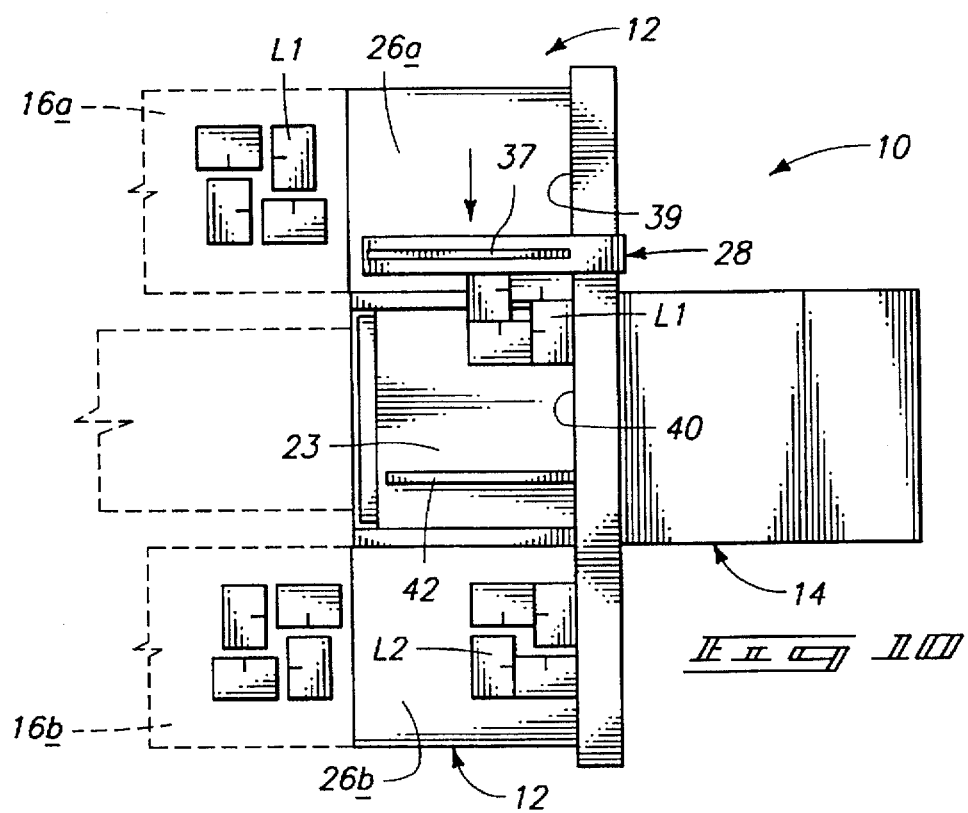

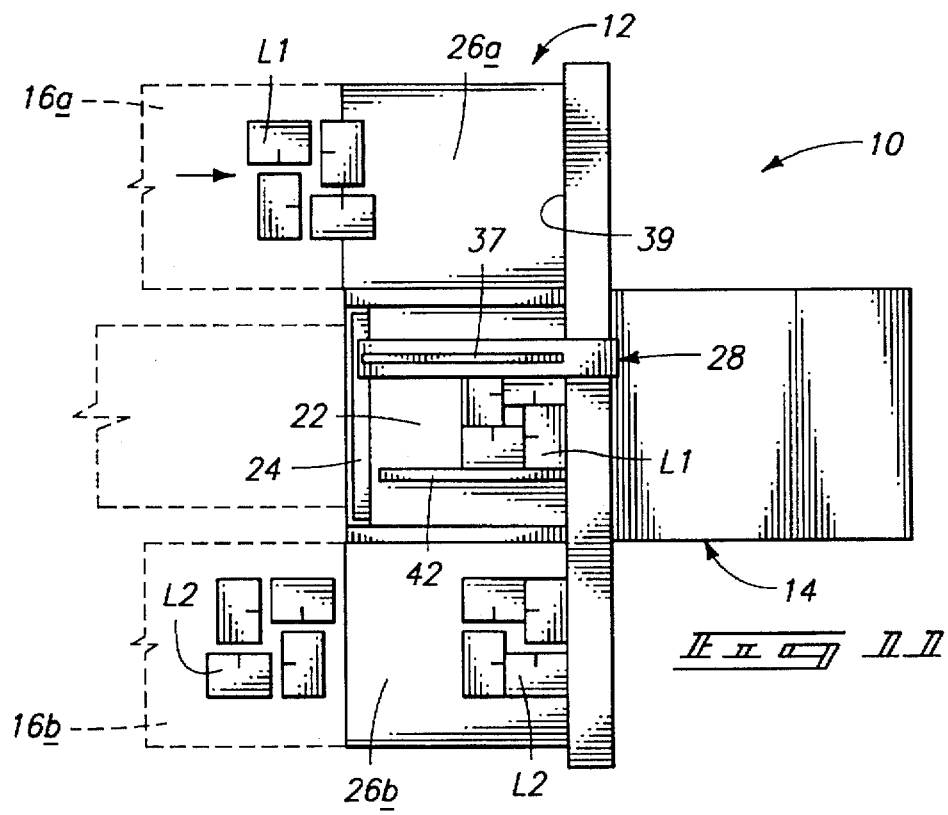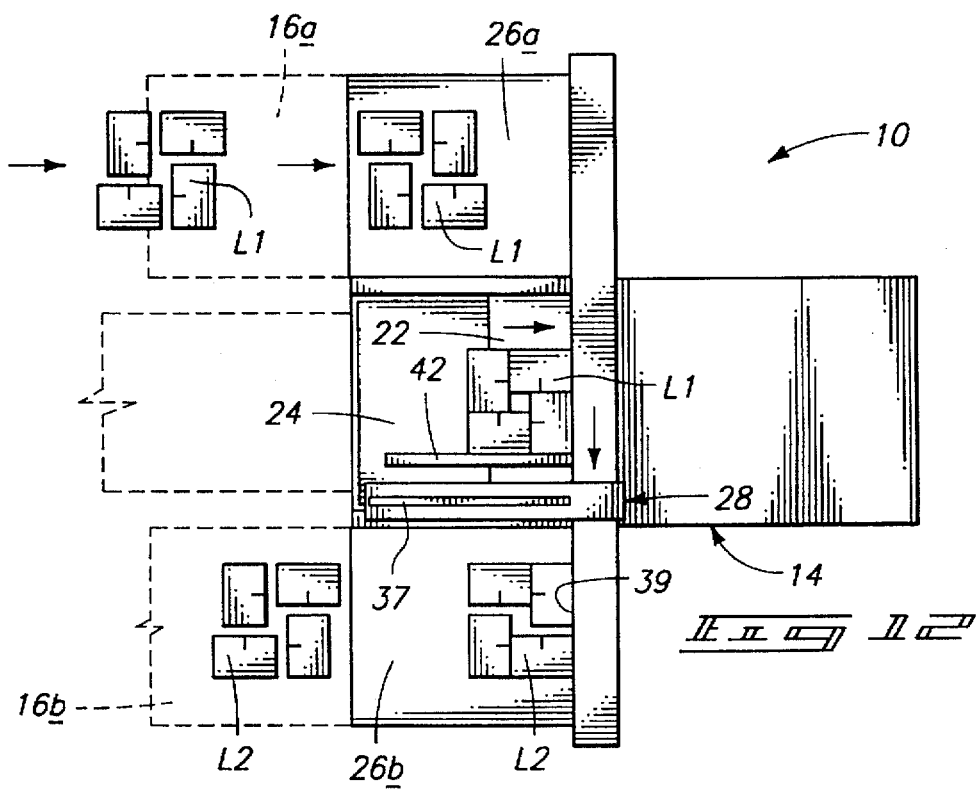

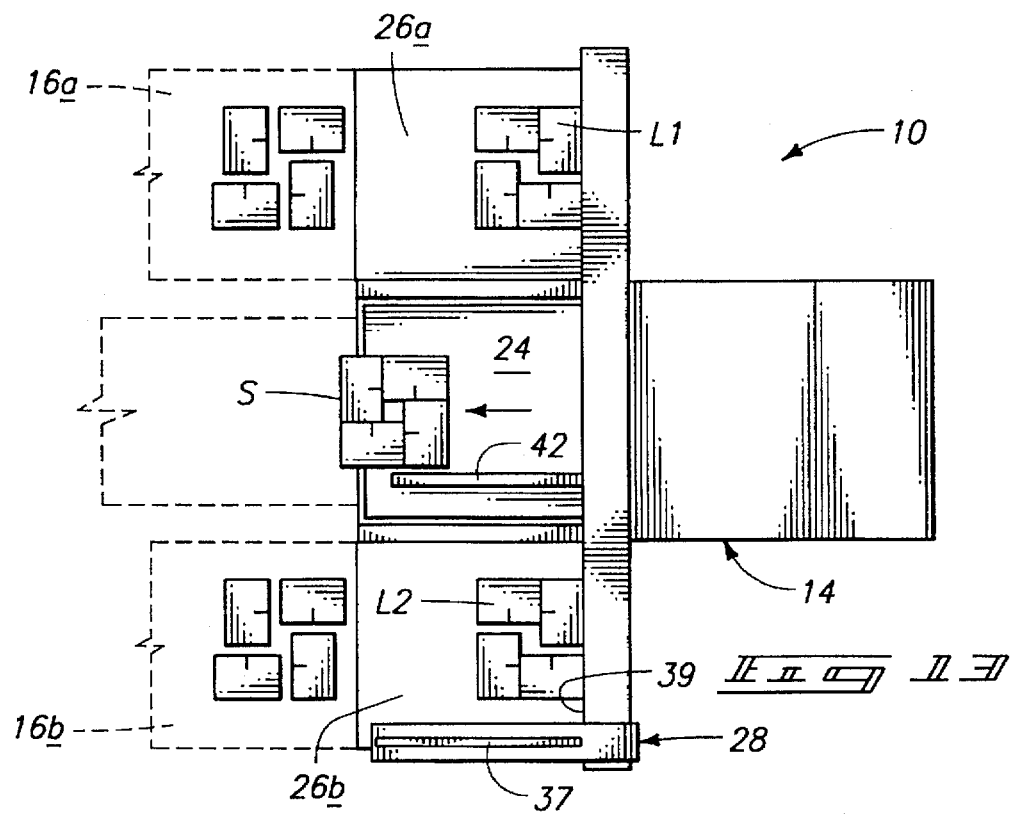
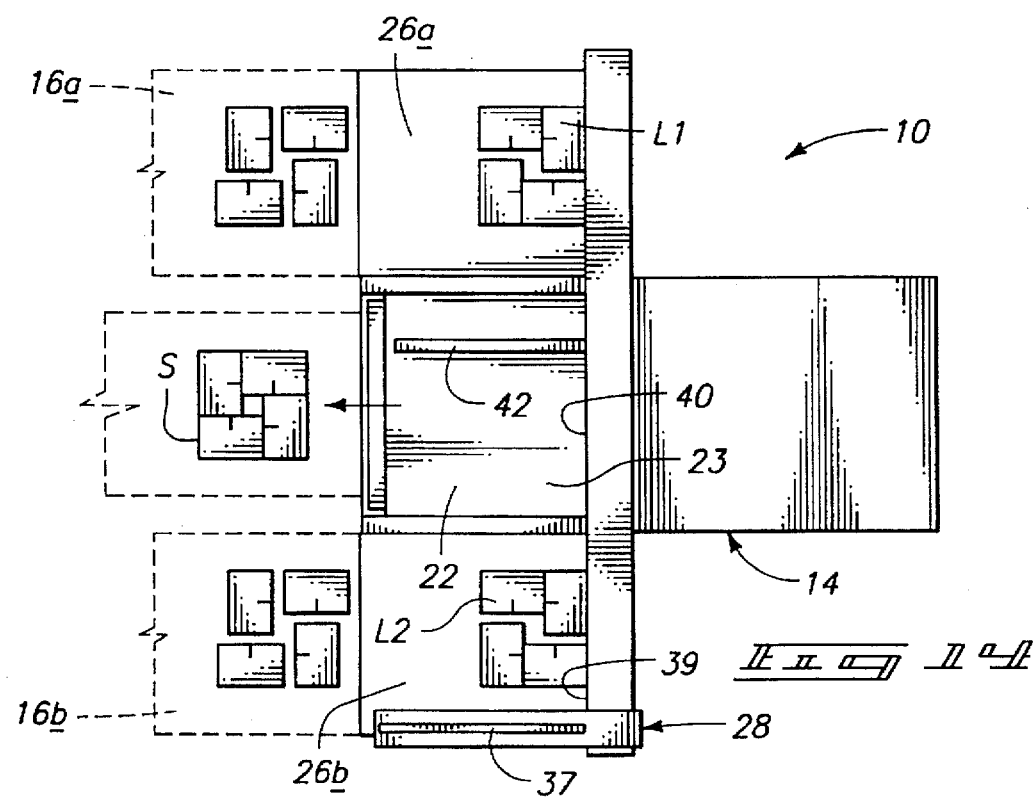

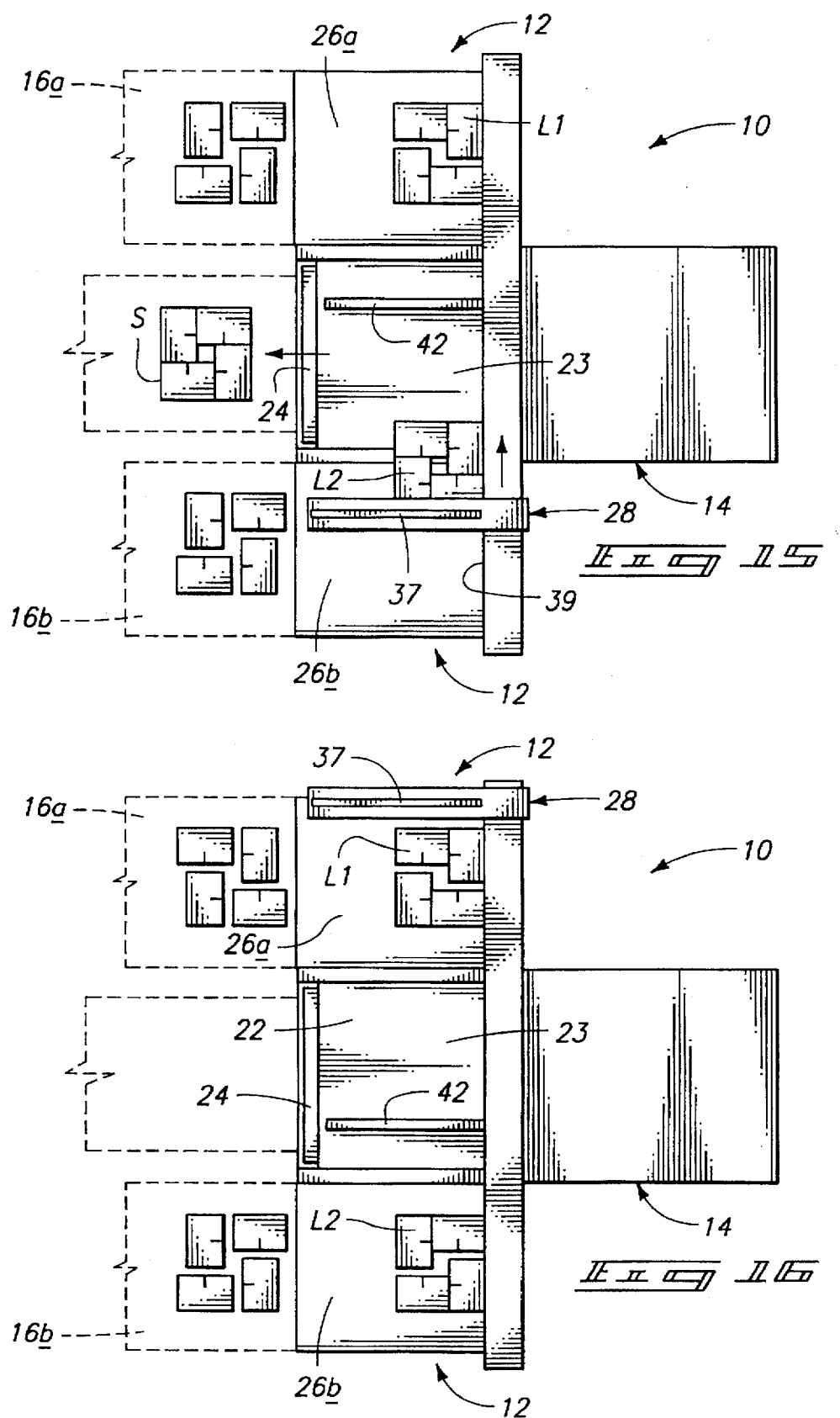

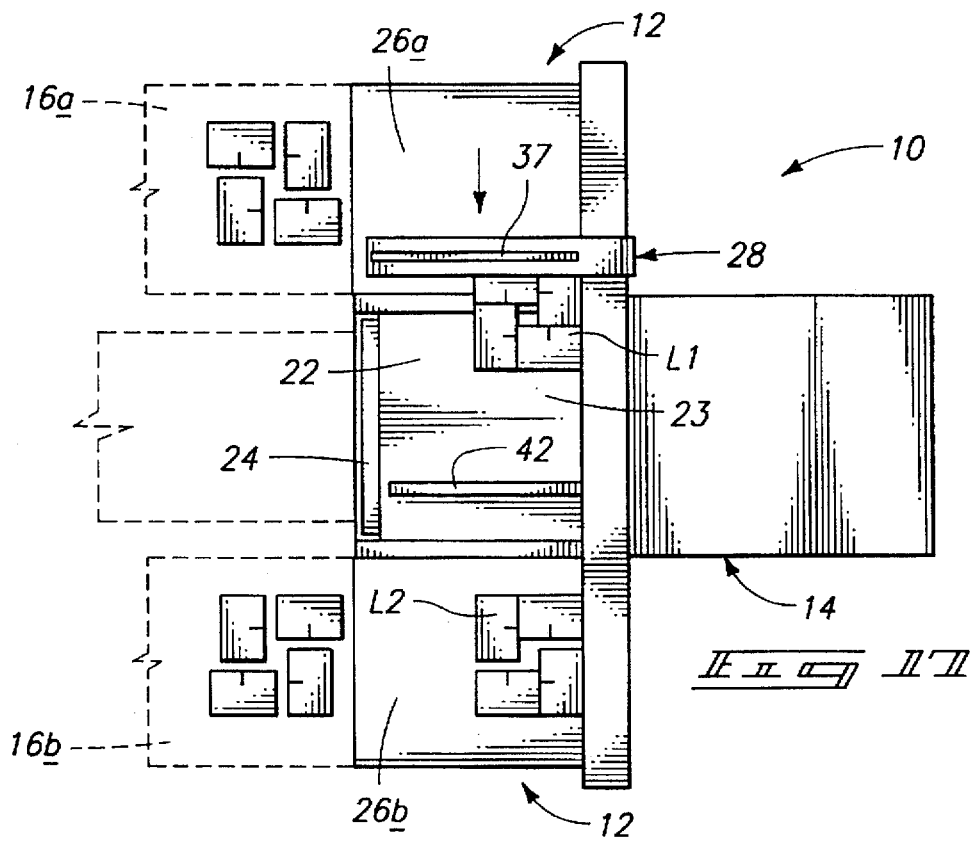
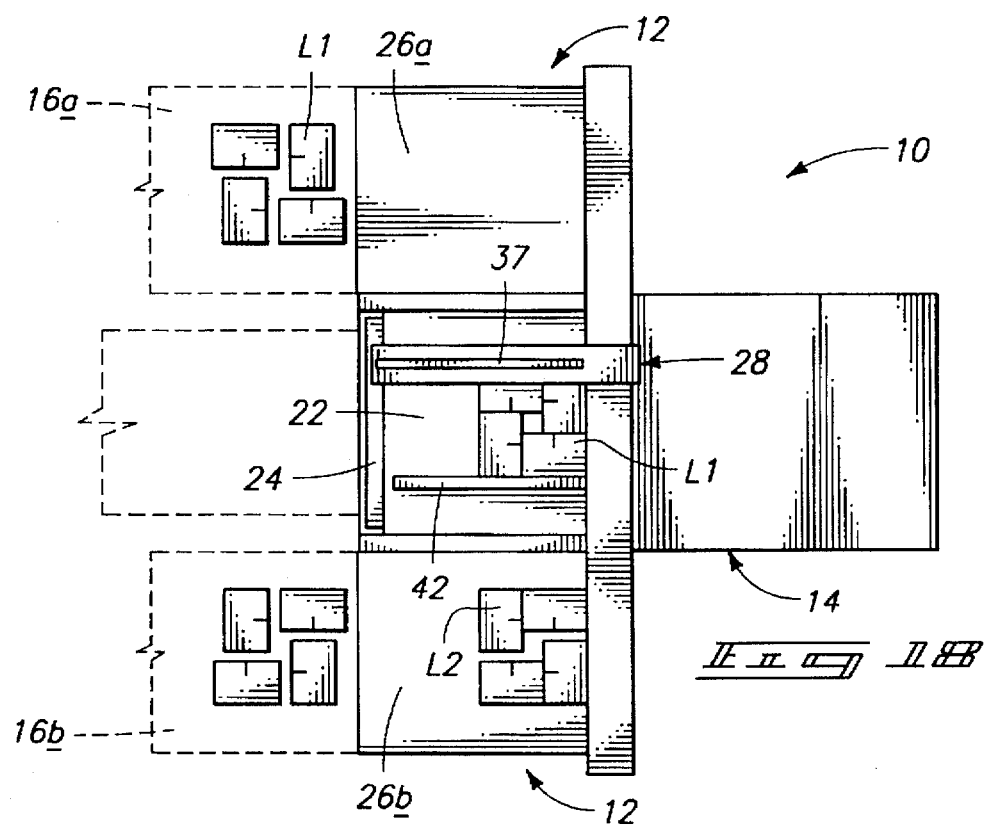

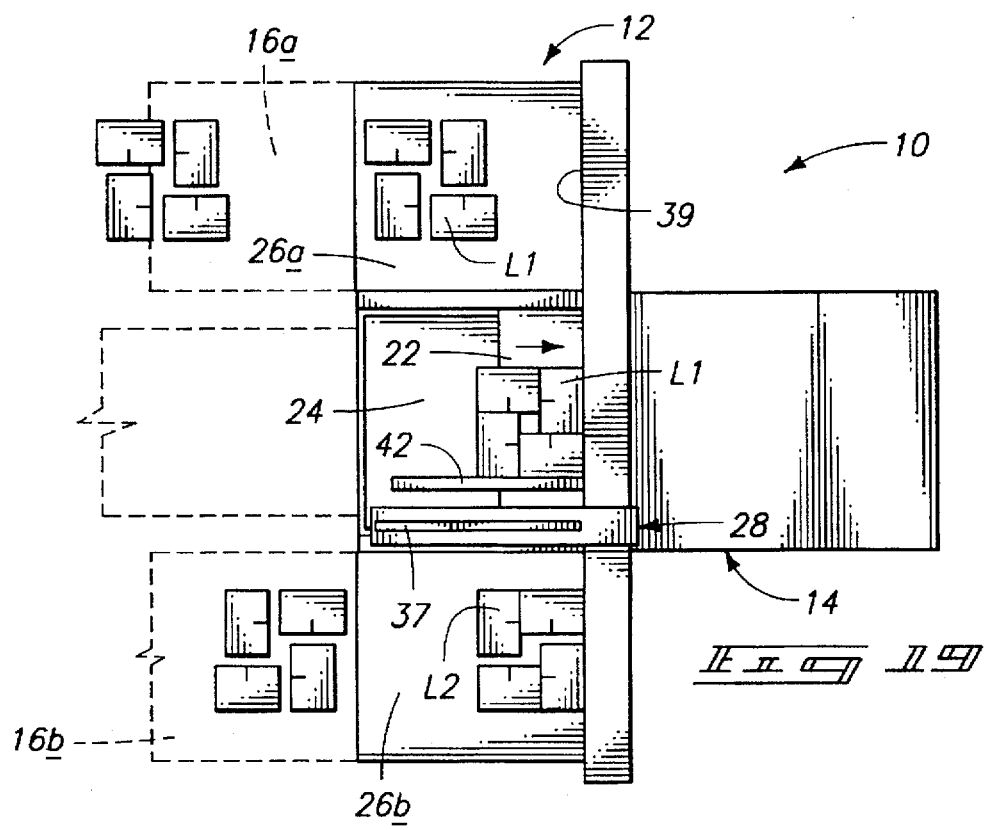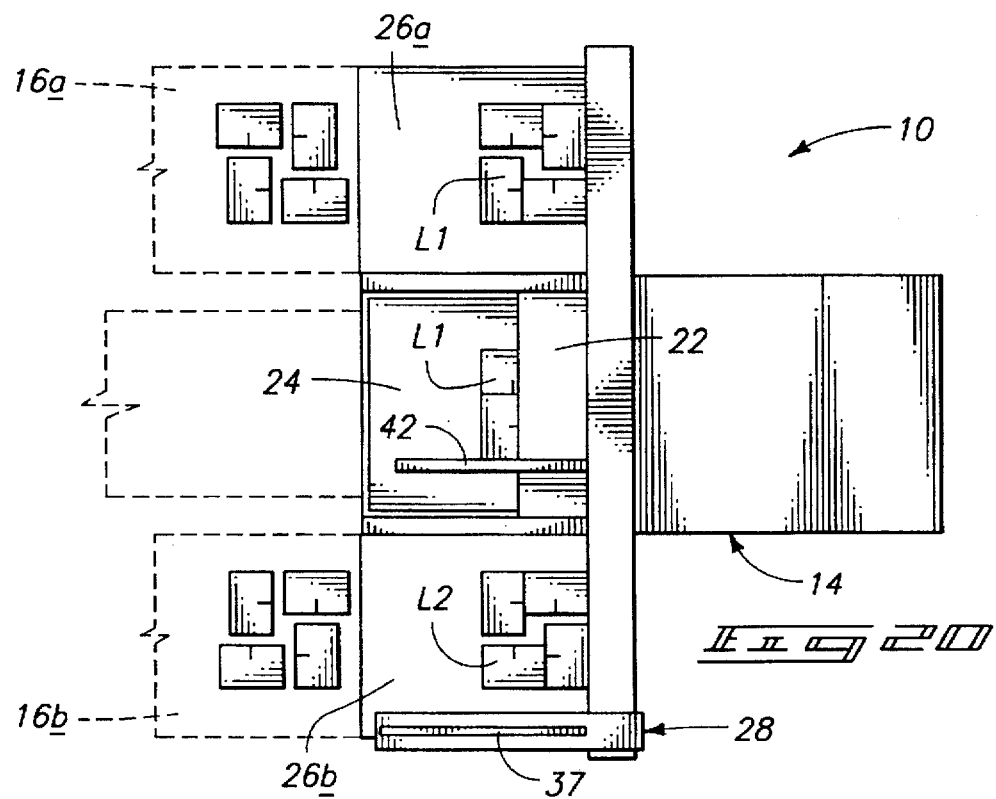

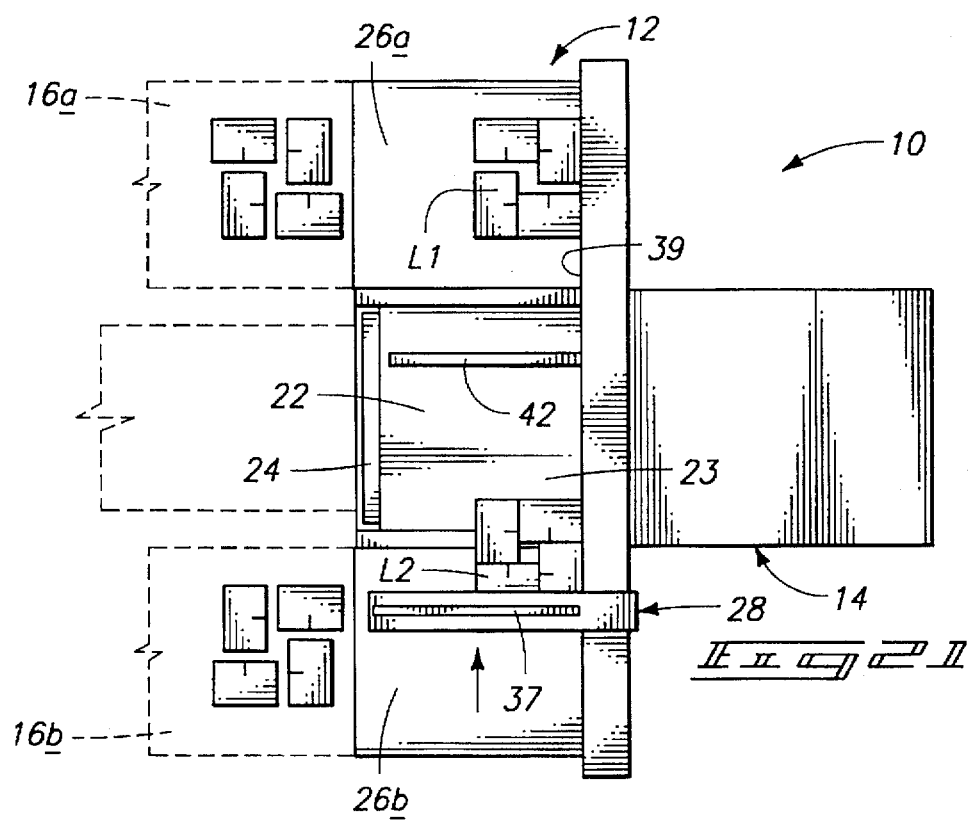
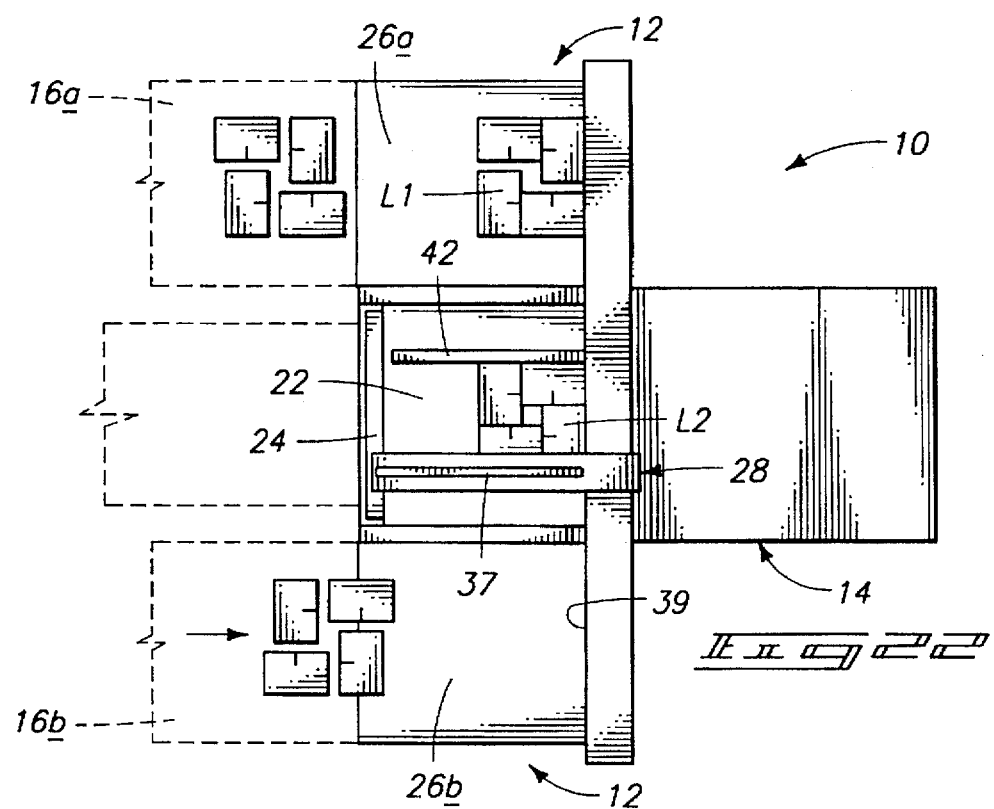

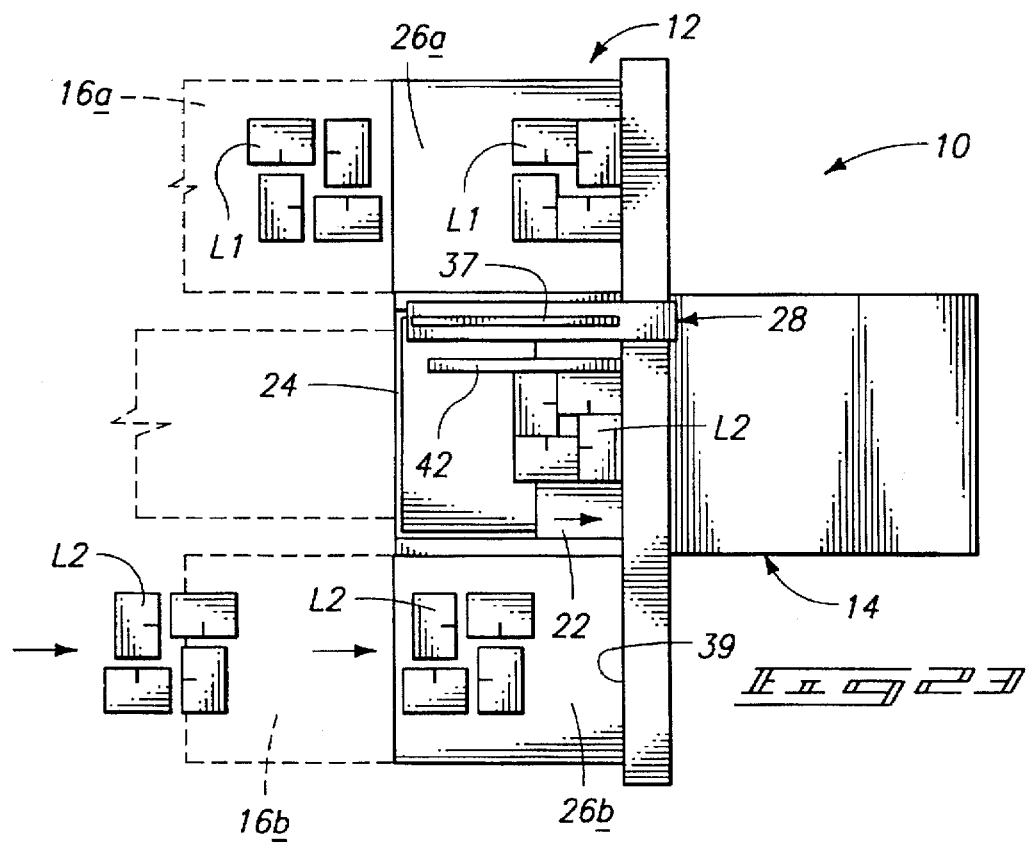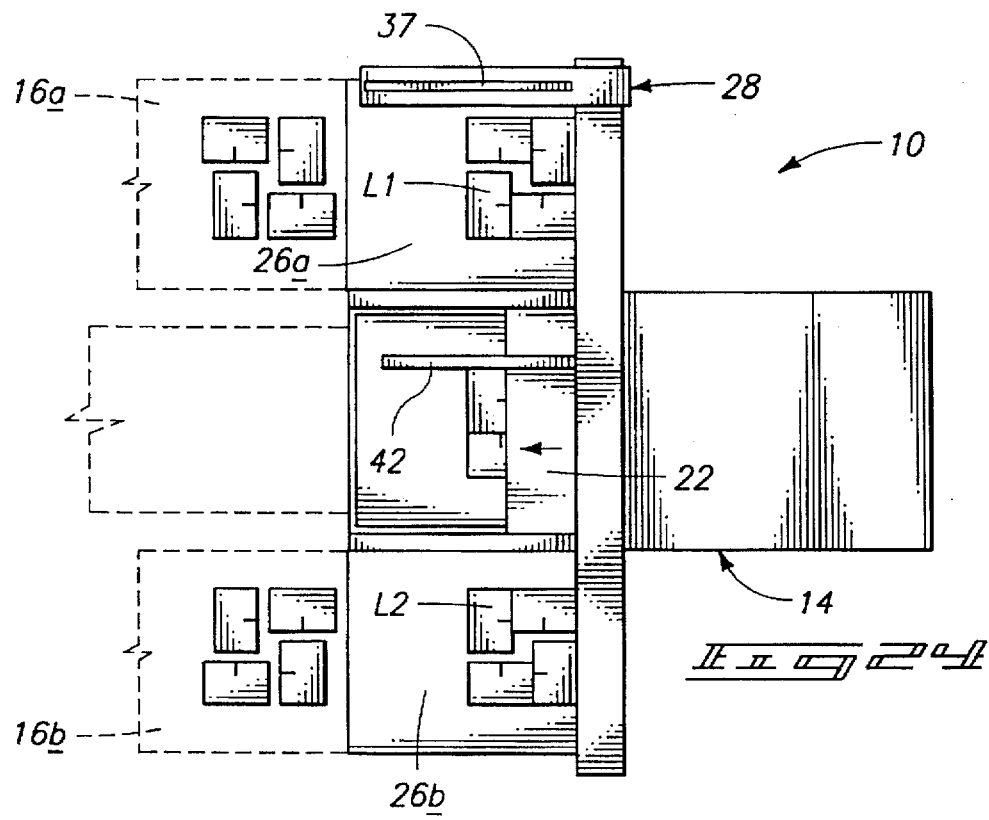

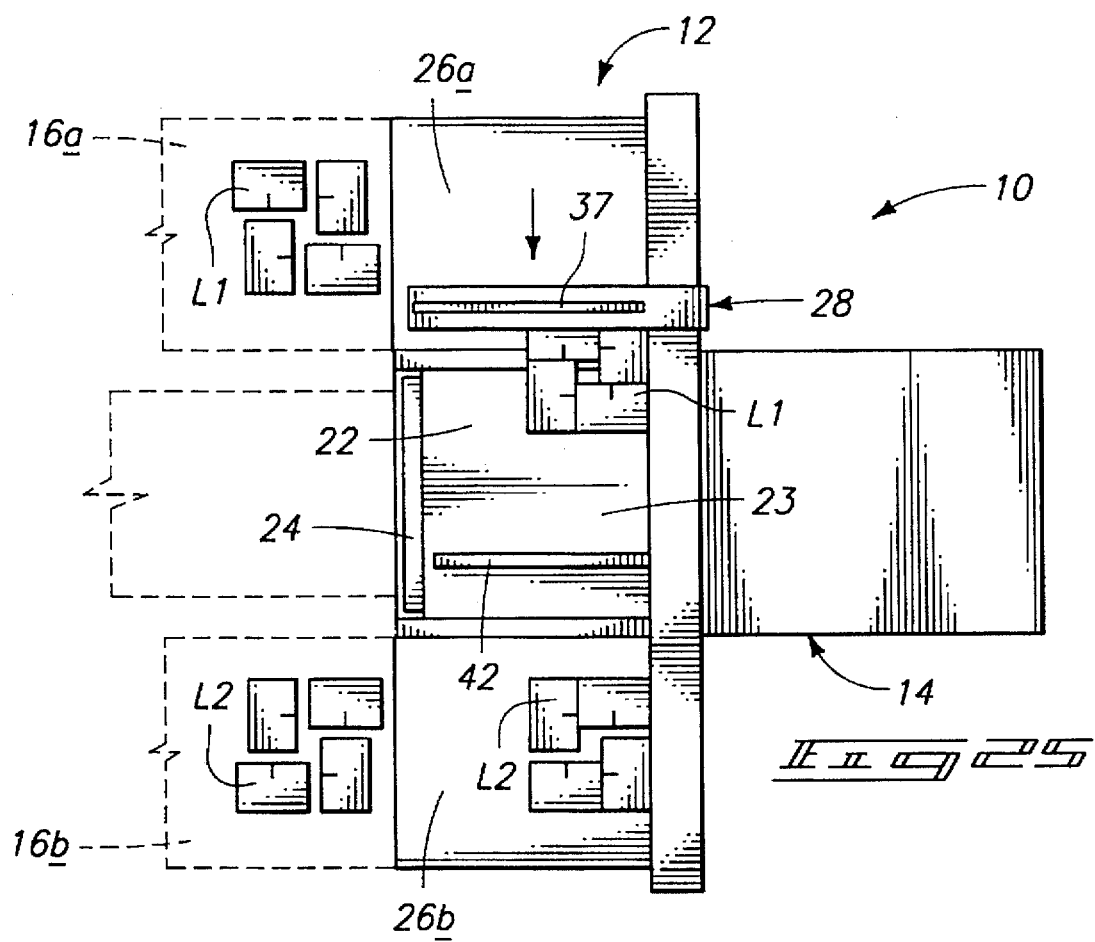

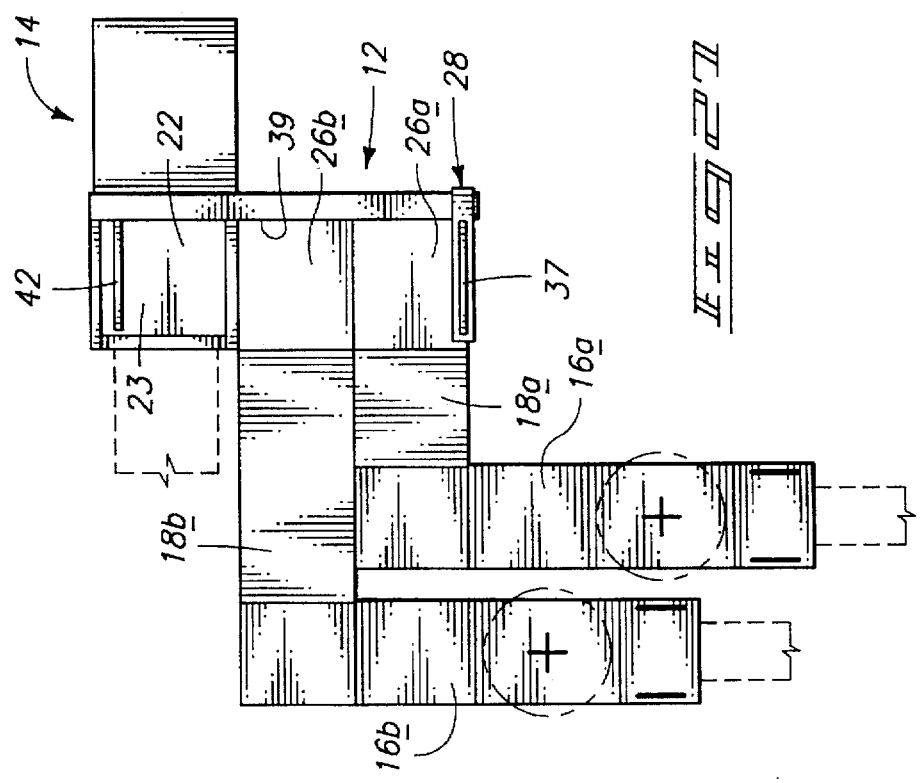
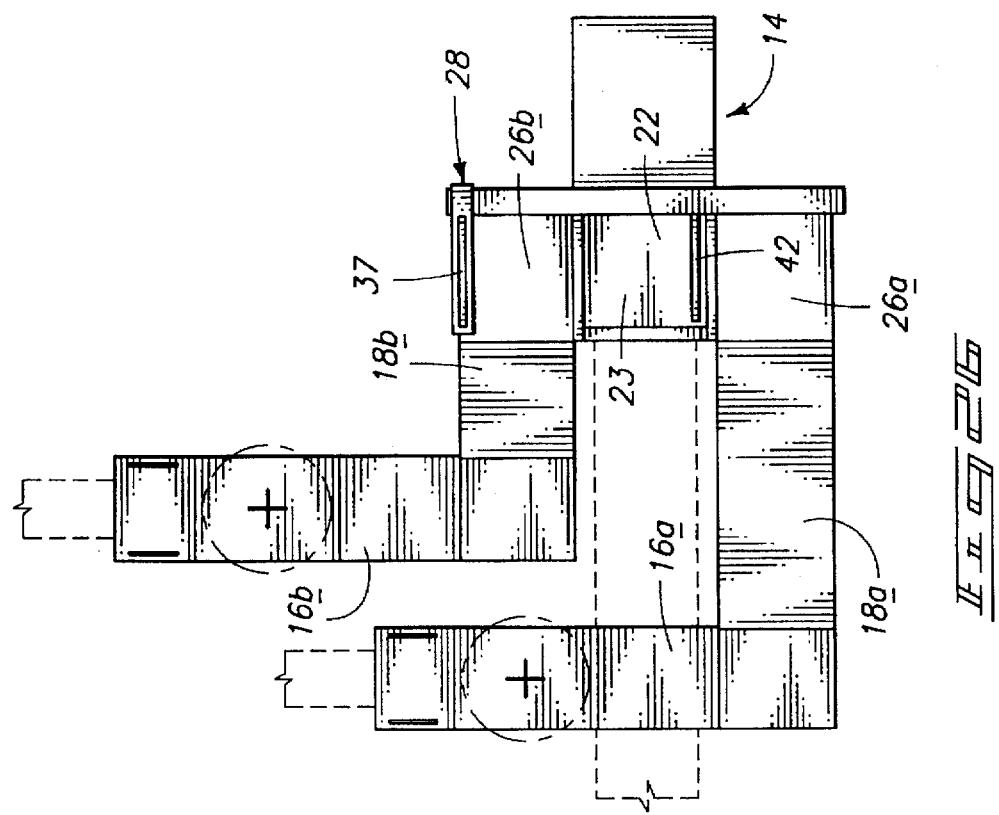

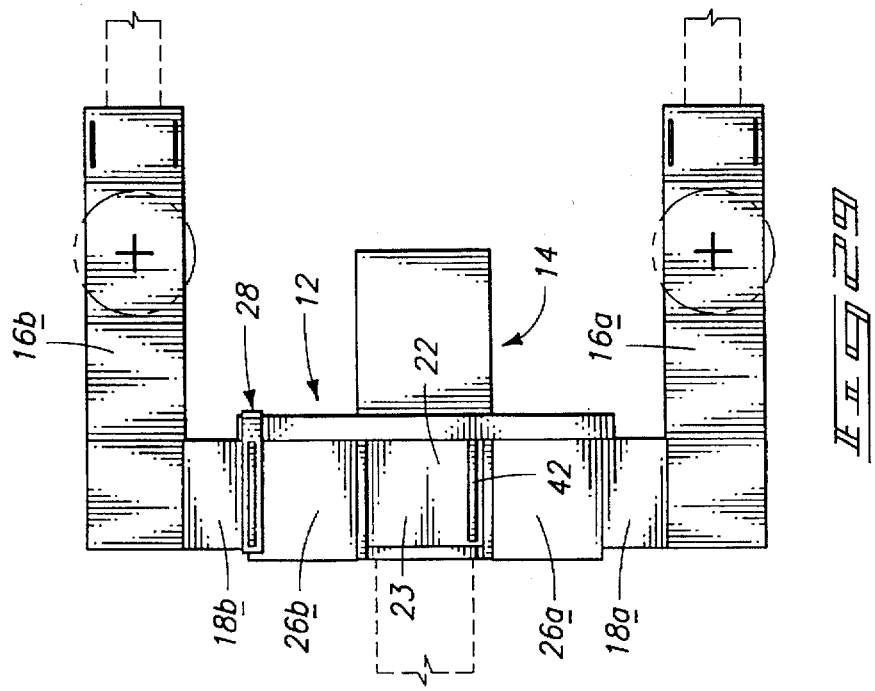
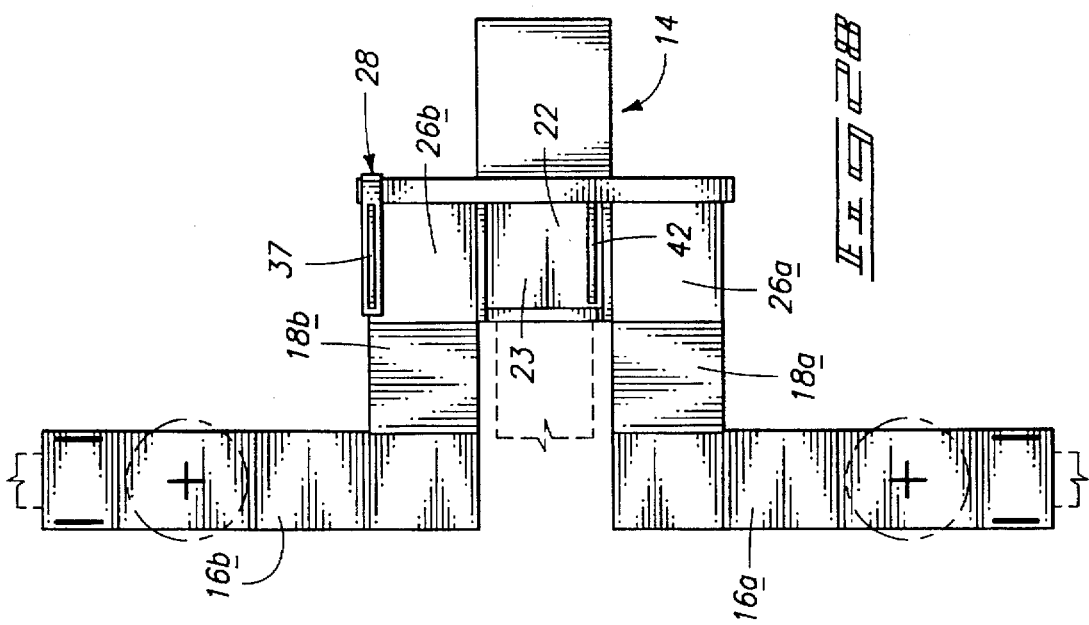

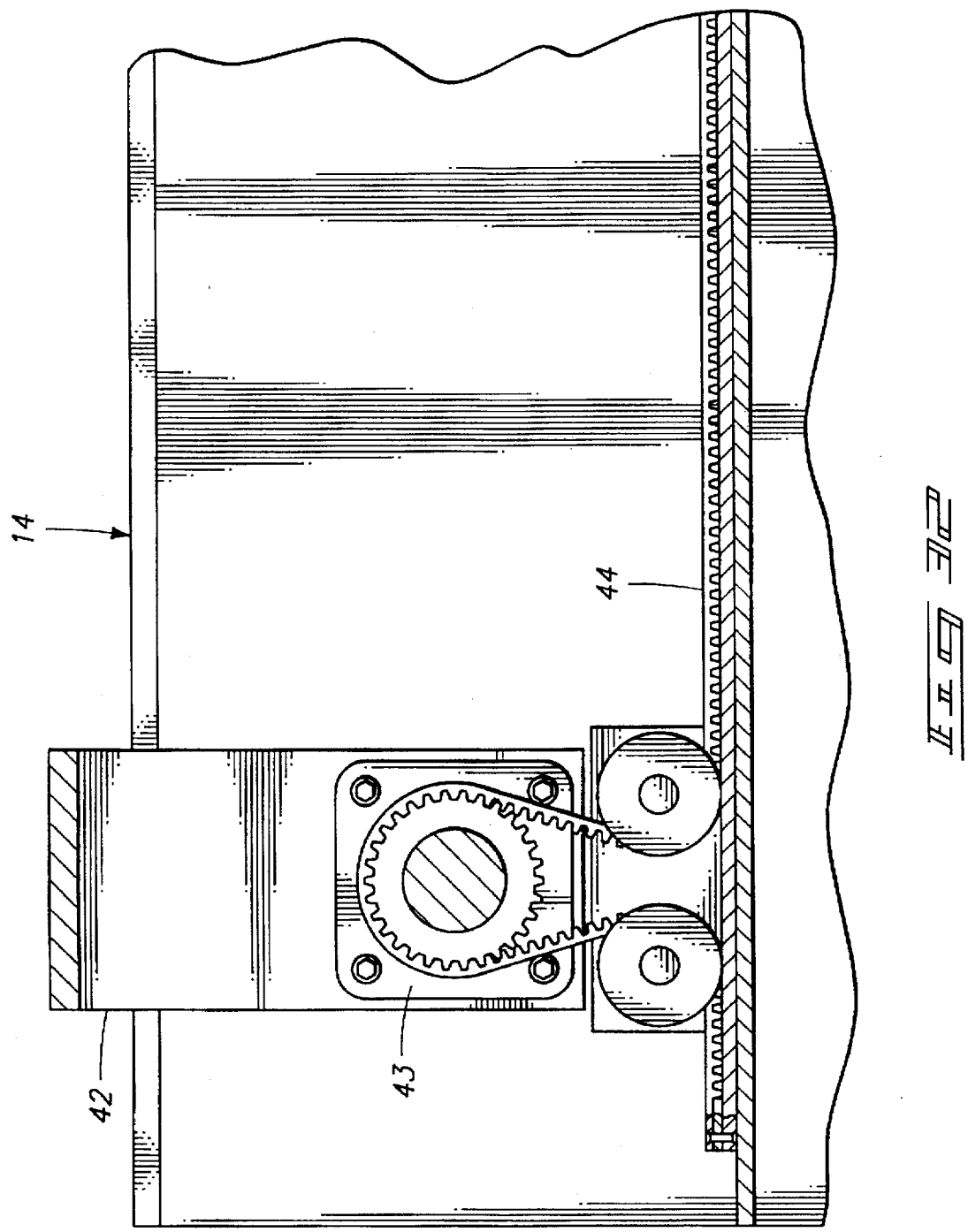

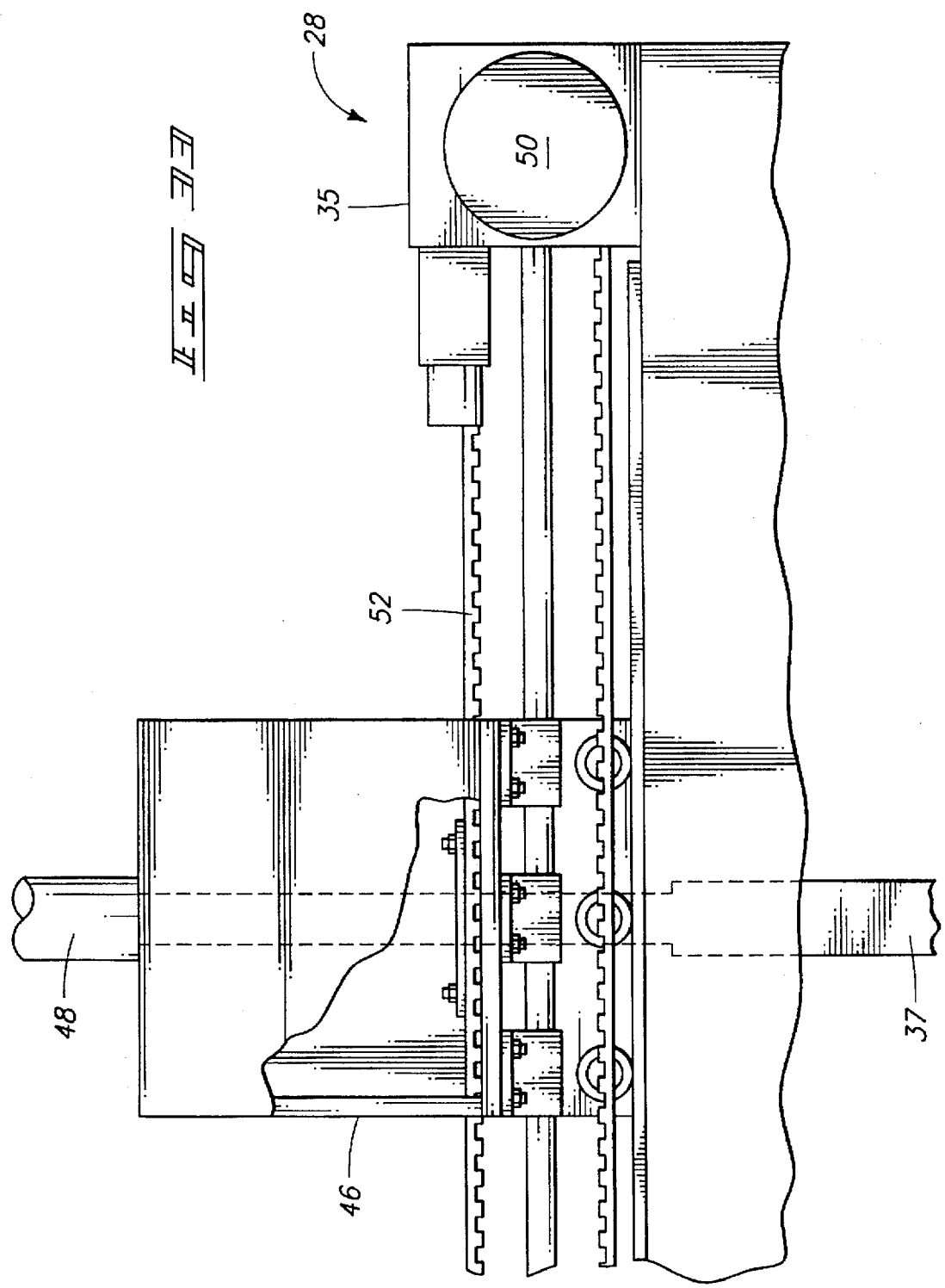

BUNDLE FEED APPARATUS FOR DELIVERING MULTIPLE BUNDLES TO A LOAD FORMER

TECHNICAL FIELD

The present invention relates to supplying bundles to a load former and more particularly to bundle feeding and load forming apparatus.

BACKGROUND OF THE INVENTION

The Assignee of the present invention, Thermoguard Equipment Inc., of Spokane, Wash., U.S.A., manufactures and sells bundle stacking equipment under the brand name "LOADMASTER". The "LOADMASTER" load former has capability of forming stacks of bundles arranged in layers and placed on pallets, or for simply stacking accumulated layers of bundles on a thin paper "bottom sheet". The "LOADMASTER" load former has capability of forming successive "loads" (a term used herein to mean a formed stack comprised of vertically stacked layers of bundles) at a rate that is faster than previously known layer forming equipment.

As used herein, the term "bundle" should be broadly understood as a stackable object. Thus boxes, crates, bags, bales, discrete stacks of articles, individual products, and other stackable objects are fairly included within the meaning of the term "bundle" as used in this disclosure. Also the term "layer" as used herein should be understood as meaning one or more bundles that make up each level or tier in a load.

For purposes of example, the present load forming apparatus is shown and described below for forming and transferring layers of flat box blank bundles (see FIG. 1 of the drawings). A stack or load S is formed of individual bundles B (FIG. 2) made up of roughly equal numbers of box blanks. The bundles B are gathered in groups forming individual layers L. The layers L are successively placed one upon another to form a load S.

Known prior layer forming equipment has been produced that will take individual bundles and either facilitate manual arrangement of the individual bundles into selective patterns as layers, or that will at least partially automatically arrange the bundles into layers of selected configurations. In either instance, the rate at which the layers are formed is often slower than the operation of the "LOADMASTER" load former. It thus becomes desirable to increase the feed rate to the load former and thereby maximize the total operational speed and efficiency of the load forming operation.

One of the objectives and advantages of the present invention is to more appropriately utilize the capability of the "LOADMASTER" load forming equipment.

Another objective and advantage is to provide the capability of handling and delivering loads of different bundles to a single "LOADMASTER" load former.

A still further objective is to provide the capability of selective operation, to facilitate automatic layer forming, and transfer to the "LOADMASTER" load former, or to facilitate manual layer formation and transfer.

These and still further objects and advantages of this invention will become apparent upon review of the following description and the appended drawings, which exemplify preferred forms of the present invention.

BRIEF DESCRIPTION OF THE DRAWINGS

Preferred embodiments of the invention are described below with reference to the following accompanying drawings.

FIG. 4 is a perspective view of an arrangement in which a manual operator's station is provided;

FIGS. 5–15 are graphical operational views showing one mode of operation for the present invention;

FIGS. 16–25 show another operational mode sequence;

FIGS. 26–29 show various arrangements of first and second conveyors of the present invention;

FIG. 32 is an enlarged sectional view showing a drive mechanism for selectively moving a layer engaging stop on the load former; and FIG. 33 is an enlarged sectional view showing a drive mechanism for selectively moving a layer transfer member.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
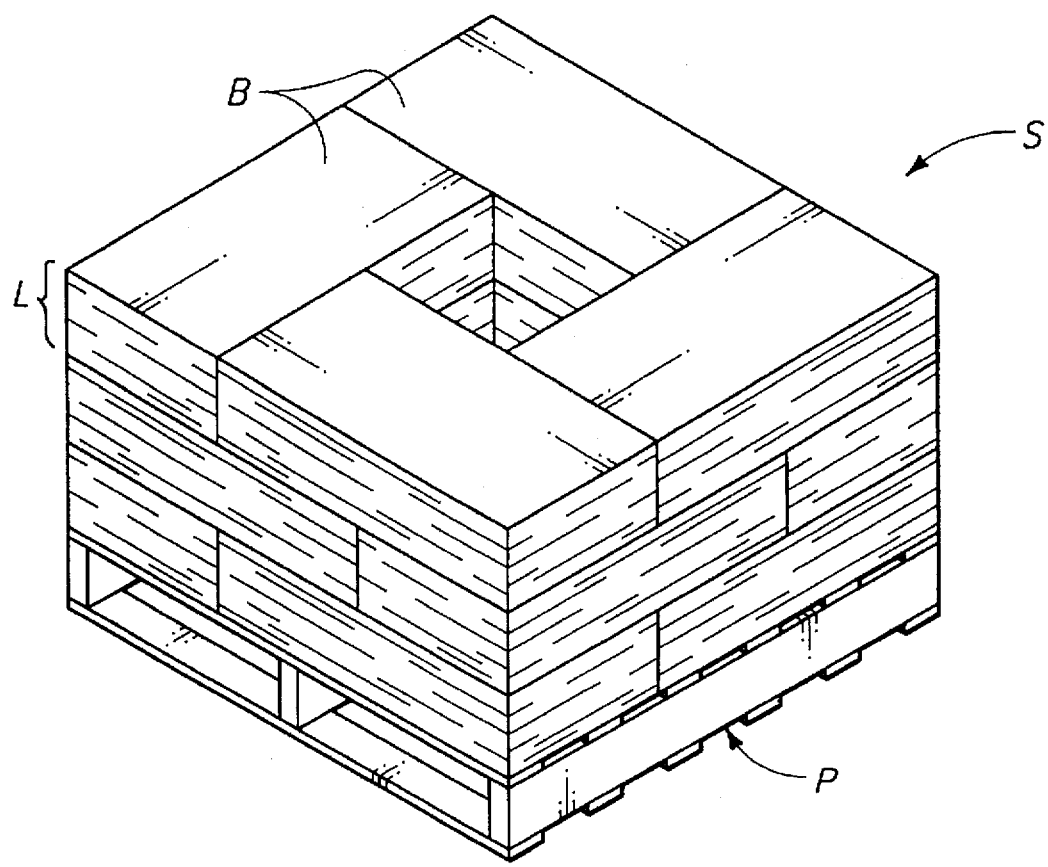
FIG. 1 is a perspective view of an exemplary formed load supported on a pallet.
Figure 2:
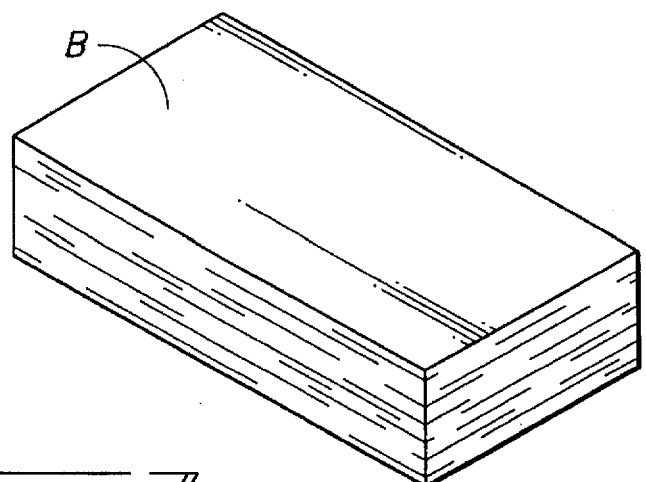
FIG. 2 is a perspective view of an exemplary bundle, multiples of which make up the load shown in FIG. 1.

In the drawings, a load forming apparatus 10 is shown exemplifying a first preferred form of the present invention, for forming a load S comprised of layers L of bundles B (FIGS. 1, 2).

It is noted that the presently preferred load forming apparatus 10 includes in combination, load former feed system 12, and a load former 14. A subcombination of the present invention may include only the load former feed system 12, for ultimate combination as a retrofit to an existing load former 14.

The layer feed system 12 functions well with the "LOADMASTER" load former produced and sold by the Assignee of this application, Thermoguard Equipment Co. of Spokane Wash., U.S.A. It should be understood however that the present feed system 12 may also be made to function well with other load formers.

Figure 3:
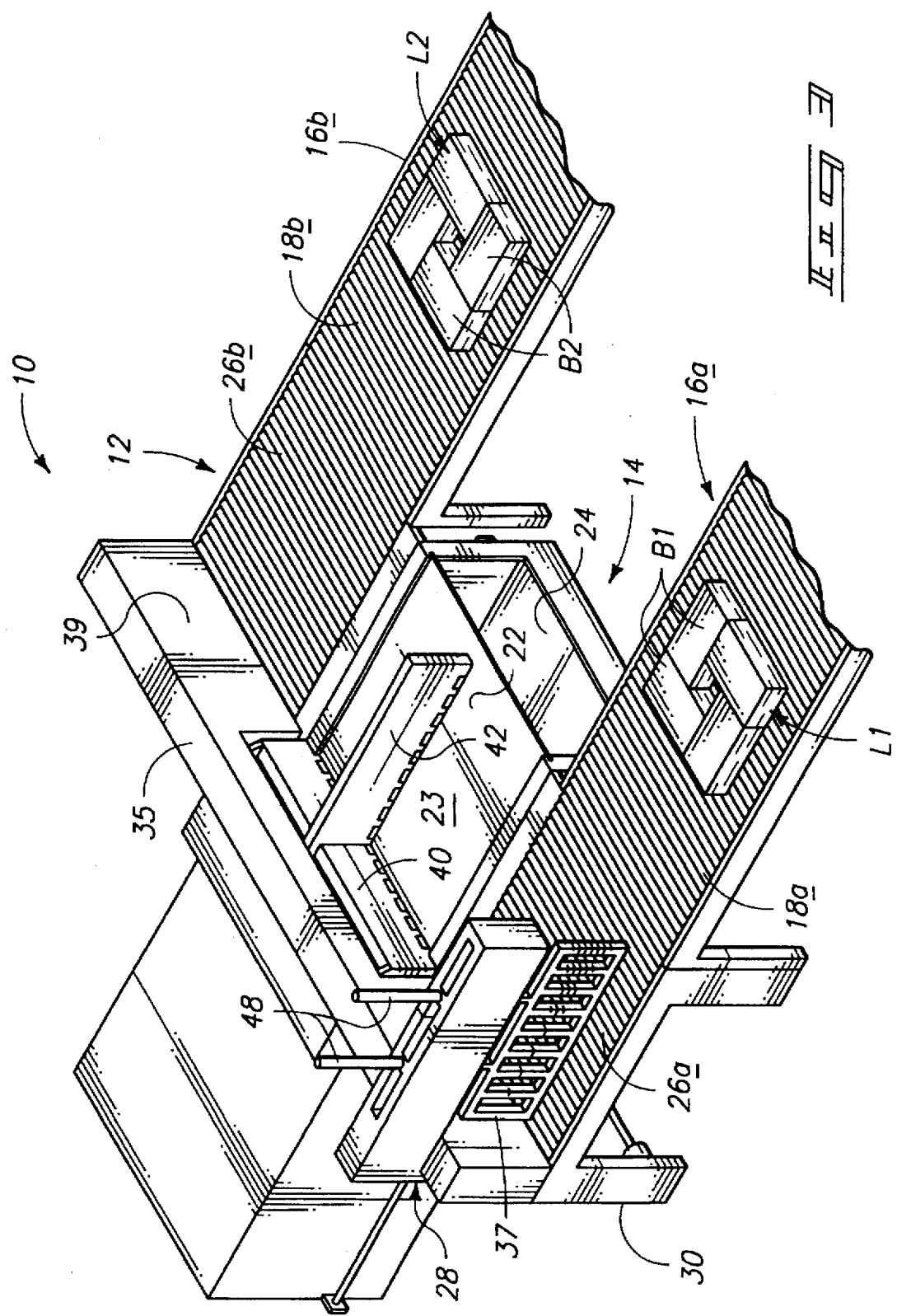
FIG. 3 is a perspective view of a first preferred form of the present invention.

In reference to FIG. 3 of the drawings, the preferred load forming apparatus 10 is shown generally including a first conveyor 16a configured to deliver individual first bundles B1 of load components to a first discharge end 18a. The preferred apparatus 10 also includes a second conveyor 16b configured to deliver individual second bundles B2 of load components to a second discharge end 18b.

In one form (FIG. 26), the first and second conveyor 16a, 16b discharge ends 18a and 18b are situated on opposed sides of the load former 14. In another form (FIG. 27), the first and second conveyor discharge ends 18a, 18b are situated on one side of the load former 14. Other possible arrangements for the conveyors 16a and 16b are shown by way of example in FIGS. 28 and 29. Still other set-up arrangements can be devised according to the needs of the customer.

The load former 14 operatively joins the first and second discharge ends 18a, 18b to receive successive layers L1 and, or L2 from the respective conveyors 16a, 16b. The load former 14 includes known conventional components including a retractable layer stripper plate 22 that is used to receive individual bundles or successive layers of bundles at a load forming station 23. The stripper plate is retractable to strip the received layers one onto another to form a load S on a lift conveyor 24 which is also a part of the conventional load former.

The load S may be formed at the load forming station 23 with or without a pallet P (FIG. 1), fed from an accessory device to the load former (not shown). The load S may also be formed with tie and or bottom sheets (not shown) using appropriate placement apparatus along the load former 14 that are also known in the industry. Additional details of the load former 14 and upstream conveyor apparatus will not be included further in this disclosure beyond those details needed to describe the present invention, since such load formers and bundle handling apparatus are known and in current use in the industry. The "LOADMASTER" load former as identified above is exemplary of such known apparatus. Other load formers such as those disclosed in U.S. Pat. Nos. 3,164,080, and 3,844,422 to Miller Jr. and Smith et al respectively also show load formers in which successive layers are delivered to a stripper mechanism that retracts to deposit a received layer on a lift device. Bundle orienting apparatus is exemplified in the above patents, and in other load former patents such as U.S. Pat. No. 4,026,422 to Leenaards and, U.S. Pat. No. 4,271,755 to Kintgen et al. Such references are hereby incorporated by reference in the present application.

It is also pointed out that in preferred forms, the first and second conveyors may be substantially similar, or make use of similar components that are mirror images of one another across the present apparatus 10. Thus, the second conveyor 16b may, if desired, be a mirror image of the first conveyor 16a.

The bundle support and transport arrangements used in the first and second conveyors 16a, 16b may include various known forms of powered belt and roller conveyors, along with various positioning apparatus that are also common in the art. Such apparatus may be used selectively, or manual manipulation of successive bundles may be used to initially orient the bundles for operation by the present invention.

At least one of the first or second conveyor 16a, 16b (preferably both) will include a transfer station 26a or 26b adjacent the respective discharge end 18a or 18b. The transfer stations 26a, 26b are comprised of roller, plate, or belt type conveyors that are positioned along the conveyors 16a, 16b to receive successive bundles and for forming layers L prior to transfer to the load former.

A single transfer device 28 is situated at the transfer stations 26a, 26b for shifting successive layers from either or both of the transfer stations 26a, 26b to the load former 14. The transfer stations 26a, 26b and transfer device 28 are mounted to a mobile frame 30 and, in a preferred form, all are selectively movable to form manual operator stations 32a, 32b (FIG. 4) adjacent the load former 14. This feature will be discussed in further detail later on in this disclosure.

The transfer device 28 is alternatively operable to (a) move the first bundles B1, which may be grouped into layers L1, from the first transfer station 26a to the load former 14 to form a load S comprised of one or more of the first bundles B1; (b) move the second bundles B2 from the second transfer station 26b to the load former 14 to form a load S comprised of second bundles B2; or (c) alternately moving the first and second bundles B1 and B2 from the first and second transfer stations 26a, 26b to the load former 14 to form a load S comprised of first and second bundle layers L1 and L2.

The preferred transfer device 28 includes a transfer frame 35 spanning the first and second conveyors 16a, 16b. A layer transfer member 37 is movably mounted to the transfer frame and is movable along the transfer frame to selectively shift a layer L1 or L2 from either or both first and second transfer stations 26a, 26b to the load former 14.

A layer guide surface 39 provided on the transfer frame extends across the first and second conveyors. When in the operative position as shown in FIG. 3, the layer guide surface 39 is substantially coplanar with a layer abutment surface 40 (FIG. 3) on the load former 14.

A movable layer engaging stop 42 is provided on the load former 14, extending perpendicular to the layer abutment surface 40. The transfer member 37 is held parallel to the layer engaging stop 42, and moves successive layers against the layer engaging stop 42 to square the layers on the stripper plate 22 at a load forming station 23.

FIG. 32 shows an exemplary drive mechanism for selectively moving the layer engaging stop 42. This arrangement may be an integral part of the load former 14 and operate in the same manner specified for the load former, with the exception that opposed sides of the layer engaging stop 42 are parallel and shaped to abut with successive layers L delivered from either first or second transfer stations 26a, 26b. A gear motor and pulley arrangement 43 is mounted to the stop 42 and acts against a flexible gear belt 44 on the loader frame to move the stop selectively across the stripper plate.

FIG. 33 exemplifies a drive mechanism for selectively moving the layer transfer member 37. The member 37 is mounted to a carriage 46 on the transfer frame 35. Lift cylinders 48 are mounted to the carriage 46 and are connected to lift or lower the transfer member 37. The transfer member 37 is selectively lifted to clear the layer engaging stop 42 when the transfer member is shifted across the load former and layer engaging stop 42 between conveyors 16a, 16b.

FIG. 33 also shows a preferred drive mechanism for selectively moving the transfer member 37 between the two conveyors 16a and 16b. In a preferred form the drive mechanism includes a gear motor 50 mounted on the transfer frame 35 and connected to a flexible gear belt 52 that is secured to the carriage 46. Operation of the motor 50 will thus cause consequent motion of the carriage and transfer member across the conveyors and load former.

The transfer structure described above is provided to accommodate arrangements as illustrated generally in FIGS. 26–29, with the conveyors 16a, 16b oriented on opposed sides of the load former 14. However, it is noted that in FIG. 27, both conveyors 16a, 16b are arranged on one side of the load former 14. The above described structure will function with little or no modification to accommodate this arrangement as well.

As briefly mentioned above, versions of the present invention may include one or more manual operator stations 32a, 32b adjacent the load former 14. In FIG. 4, two such stations 32a, 32b are shown, one for each conveyor 16a, 16b. Though two stations are shown, it is possible that only one such station may be provided, depending upon the needs of the customer.

In order to form the manual operator stations, the transfer stations 26a, 26b on each conveyor and the transfer device 28 are mounted to the mobile frame 30 and are powered for selective movement along the load former 14 away from the remainder of the conveyors 16a, 16b to form access spaces for manual operator stations 32a, 32b adjacent the load former 14. The transfer device 28 and stations 26a, 26b may thus be rolled out of the way so an operator can manually move bundles from the conveyors onto the load former 14.

The manual operator stations are provided with a manual transfer tables 54a or 54b (FIGS. 4, 30, and 31) that are advantageously hinged to the associated conveyor 16a or 16b. The tables swing down to storage positions when the transfer device is in an operational position as shown in FIG. 3. The tables 54a, 54b may be lifted to operative positions as shown in FIG. 4 when the transfer device 28 is moved to form the operator stations 32a, 32b. Each table includes a folding leg 55 that is hinged and can be pivoted to a vertical operative position supporting the associated table when the table is shifted to its operative position.

Figure 30:
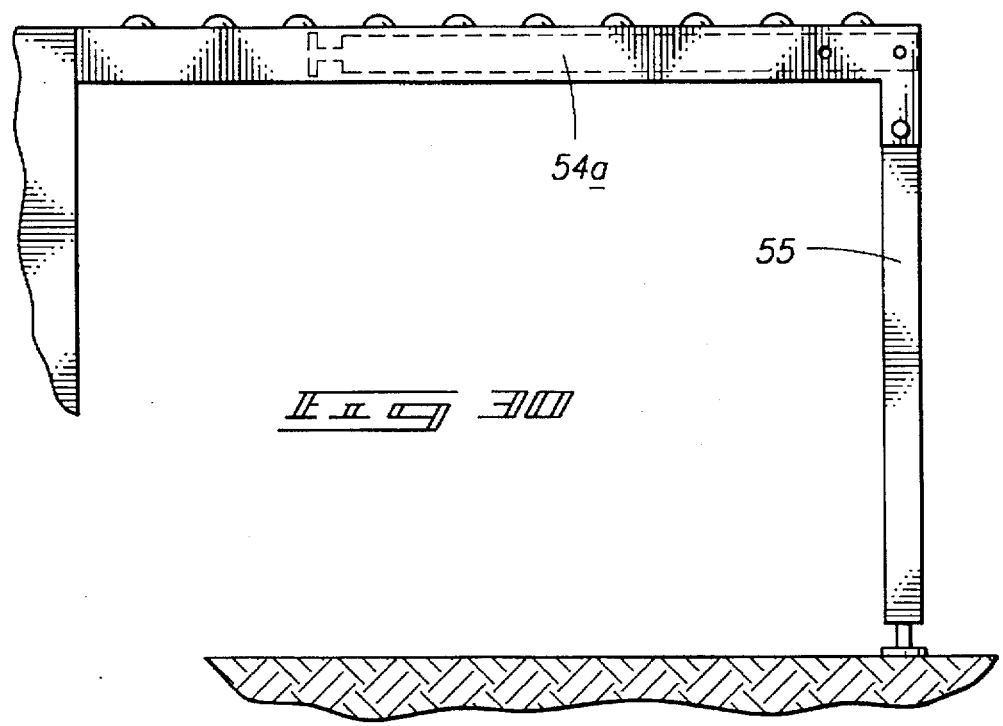
FIG. 30 is an enlarged detail end view of a manual transfer table.
Figure 31:
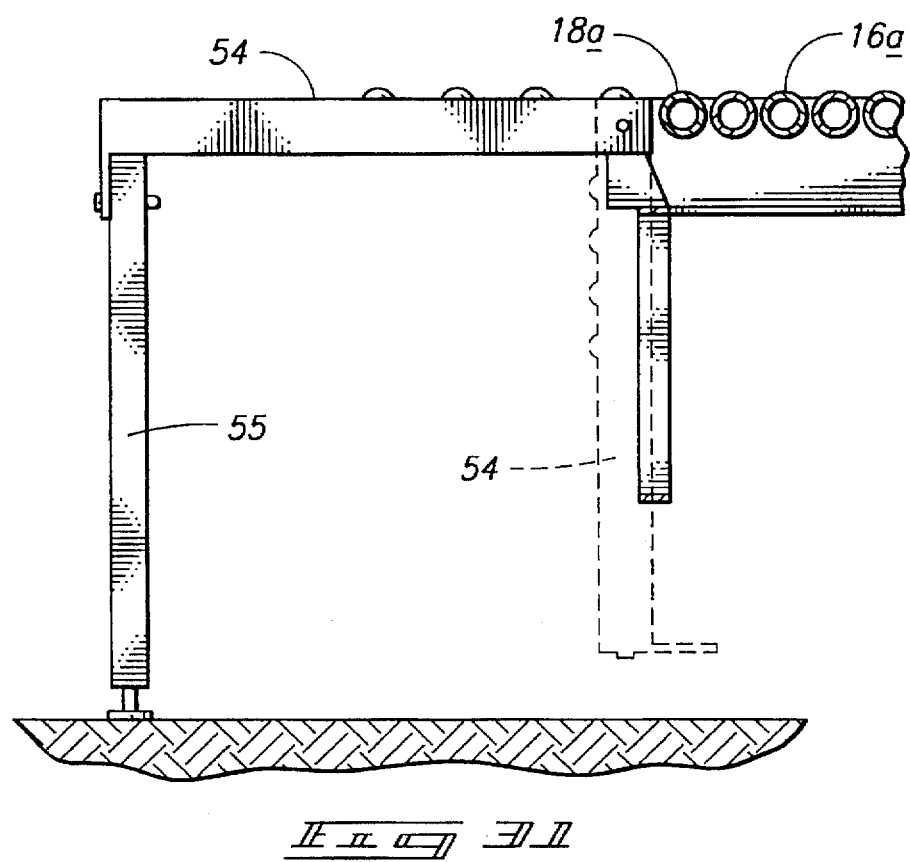
FIG. 31 is an side elevation view of the transfer table.

FIGS. 30 and 31 show one of the tables 54a in an operative position where the table top is substantially coplanar with the associated conveyor 16a and the associated leg 55 is pivoted down to an operative position. The tables are thus positioned to receive successive bundles from either conveyor 16a, 16b and permit manual shifting of the successive bundles to the load former 14.

Operation of the embodiments in the manual mode is effected primarily by an operator at either or both of the operator stations 32a, 32b. First the transfer device 28 is moved away from the remaining parts of the conveyors 16a, 16b, to form the manual operator stations 32a, 32b. Either or both of the transfer tables 54a, 54b are then lifted and the legs 55 are dropped to support the tables at the elevation of the conveyors and stripper plate. Successive bundles are delivered from a source (not shown and not a part of the present invention) along the selected conveyor 16a or 16b (or both, if two operators are used) to the appropriate operator station. The operator then slides the bundle across the adjacent transfer table 54a, 54b and onto the stripper plate 22 of the load former 14.

The layer abutment surface 40 and the layer engaging stop 42 are used to register the bundle over the stack to be formed. Once a sufficient number of bundles have been accumulated to form a layer on the stripper plate, the operator may activate the stripper plate 22 to retract and the accumulated layer is stripped against the layer abutment surface 40 and onto the lift conveyor 24 below. This process is repeated until enough layers have accumulated on the lift conveyor to constitute a load. At this time the lift conveyor is activated to discharge the load for further handling, storage, or shipping.

Operation in an automatic mode begins with the transfer device positioned for operation as shown in FIG. 3. Several modes of operation may be used with the present invention, a first example of which is sequentially illustrated by FIGS. 5–15.

In FIG. 5, two partially completed layers L1 and L2 are shown at the transfer stations 26a, 26b along conveyors 16a and 16b. Two successive partially formed layers are shown on dotted outlines of the conveyors awaiting movement to the transfer stations 26a, 26b. The received layers L1 and L2 are moved by the roller conveyors at the transfer stations 26a, 26b against the layer guide surface 39, which serves to align the leading edges of the layers.

In FIG. 6, the transfer device 28 is shown actuated, to move the layer L1 off the transfer station 26a and to the load forming station 23 on the stripper plate 22. The outside edge of the layer L1 is engaged by the layer transfer member 37 and the engaged edges are aligned as the layer is moved. Note is made at this time that in this particular operational sequence the second conveyor 16b functions, if at all, to deliver a layer L2 to the transfer station 26b, but this layer is not shifted to the stripper plate. The layer L2 will await completion of the load formation from the first conveyor side of the machinery.

In FIG. 7, the layer L1 is shown at the load forming station, in position on the stripper plate 22 and a successive layer being moved to the transfer station 26a on the first conveyor. The outside edge of the layer being shifted onto the load former will come into abutment with the layer engaging stop 42. The stop 42 will have previously been positioned to determine the location of the load forming station 23 and the positions of successive layers received from the transfer station 26a on the first conveyor side of the load former. The rearward edge surface of the shifted layer L1 in the FIG. 7 position is situated against the layer abutment surface 40 on the load former, and is ready to be stripped onto the lift conveyor 24 below.

In FIG. 8, the layer transfer member 37 is elevated by operation of the lift cylinders 48 (shown in FIGS. 3 and 4) to clear the layer at the transfer station 26a, and is shown being moved back for the next successive layer L1 now positioned at the transfer station 26a. During this time the stripper plate 22 is retracted from underneath the layer at the load forming station 23, against the layer abutment surface 40. The lift conveyor 24 has been elevated prior to this point in time, to a position just below the retracting stripper plate.

In FIG. 9, the transfer member 37 is shown after full movement to the outside of transfer station 26a. The layer at the load forming station 23 is shown after deposit onto the lift conveyor 24 by action of the stripper plate 22 retracting under the layer and stripping the layer against the layer abutment surface 40 on the load former. The layer transfer member 37 is now lowered and made ready for the next successive move to bring the layer now at the transfer station 26a to the load forming station, motion of which is shown in FIGS. 10 and 11.

The above sequence of steps is repeated, and the lift conveyor is progressively lowered with each received layer until a load of predetermined size is received. Once the desired load is formed, appropriate discharge mechanisms (not shown) may be actuated to move the completed, formed load from the lift conveyor.

FIGS. 12 and 13 show the completion steps in which a load formed from the first conveyor 16a side is completed and discharged from the load former. This concludes the formation of a load from the first conveyor side, and the process steps described above can continue for a subsequent load if the second conveyor is not to be used. However it is likely to be desirable that both conveyors 16a, 16b be functional and that loads be formed from both. The customer has multiple options to utilize both conveyors and the transfer device in this situation.

FIG. 12 shows the transfer member in transit to initiate similar layer feeding steps from the second conveyor 16b side. In FIG. 12 the layer transfer member 37 has been lifted to clear the layer L1 at the load forming station 23 and the layer engaging stop 42, and is shown in progress toward the transfer station 26b on the second conveyor side. This is done as the last layer from the first conveyor side is deposited on the load.

In FIG. 13, the previously formed load S is shown being removed from the load former 14. The layer transfer member 37 is shown situated at the transfer station 26b on the second conveyor 16b side, ready to engage and move a layer L2 onto the stripper plate 22.

FIG. 14 shows the stripper plate fully extended and ready to receive the layer L2. The layer engaging stop 42 has been shifted to the opposite side of the load forming station 23 to receive and align layers received from the transfer station 26b on the second conveyor 16b.

Now operational steps may occur similar to those described above, in which successive layers L2 are moved from the second transfer station 26b to the load forming station 23. Thus operation in the above mode enables load formation from layers fed only from the first conveyor side. Then, if desired, operation may be altered so a subsequent complete load may be formed from layers L2 fed only from the second conveyor 16b.

Another mode of operation is shown in abbreviated form in FIGS. 16–25. In this mode, the loads formed include alternating layers, one fed from the first conveyor 16a side, and the next layer from the second conveyor 16b side. The result is a load formed with alternate layers from both conveyors. Discussion of the steps involved in this operational mode will not be dealt with in detail, since they involve simple alternation of operational movements already described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A load forming apparatus for forming a load comprised of layers of bundles, comprising:

a first conveyor configured to deliver individual first bundles of load components to an elevationally stationary first transfer station;

a second conveyor configured to deliver individual second bundles of load components to an elevationally stationary second transfer station;

a load former operatively joining the first and second transfer stations;

a transfer device adjacent the first and second transfer stations and alternatively operable to (a) move the first bundles substantially translationally from the first transfer station to the load former to form a load comprised of first bundles; (b) move the second bundles substantially translationally from the second transfer station to the load former to form a load comprised of second bundles; or (c) alternate moving the first and second bundles substantially translationally from the first and second transfer stations to the load former to form a load comprised of first and second bundles.

2. A load forming apparatus for forming a load comprised of layers of bundles, as claimed by claim 1 wherein the first and second transfer stations are situated on opposite sides of the load former.

3. A load forming apparatus for forming a load comprised of layers of bundles, as claimed by claim 1 wherein the first and second transfer stations are situated on one side of the load former.

4. A load forming apparatus for forming a load comprised of layers of bundles, as claimed by claim 1 wherein the transfer device is comprised of:

a transfer frame spanning the first and second conveyors; and a layer transfer member movably mounted to the transfer frame and movable along the transfer frame to selectively shift a layer from either or both first and second conveyors to the load former.

5. A load forming apparatus for forming a load comprised of layers of bundles, as claimed by claim 1 wherein the transfer device is comprised of:

a transfer frame spanning the first and second conveyors;

a layer guide surface on the transfer frame extending across the first and second conveyors; and a layer transfer member movably mounted to the transfer frame and movable along the transfer frame to selectively shift a layer from either or both first and second conveyors to the load former.

6. A load forming apparatus for forming a load comprised of layers of bundles, as claimed by claim 1 wherein the transfer stations and transfer device are mounted to a mobile frame and are selectively movable to an inoperative position to form a manual operator station adjacent the load former.

7. A load forming apparatus for forming a load comprised of layers of bundles, as claimed by claim 1 wherein the transfer stations and transfer device are mounted to a mobile frame and are selectively movable to an inoperative position to form a manual operator station adjacent the load former;

and further comprising a manual transfer table along at least one of the first and second conveyors adjacent the manual operator station, positioned to receive successive bundles from the at least one of the first and second conveyors, configured to permit manual shifting of the successive bundles to the load former.

8. A load former feed system, comprising:

a first conveyor configured to deliver individual first bundles of load components to an elevationally stationary first transfer station positioned adjacent a load forming station;

a second conveyor configured to deliver individual second bundles of load components to an elevationally stationary second transfer station positioned adjacent the load forming station and spaced from the first transfer station; and a transfer device at the first and second transfer stations, alternatively operable to move the first bundles substantially translationally from the first transfer station and second bundles from the second transfer station to the load forming station.

9. A load former feed system as claimed by claim 8, wherein the first and second transfer stations are spaced apart to opposite sides of the load forming station.

10. A load former feed system as claimed by claim 8, wherein the first and second transfer stations are both situated to one side of the load forming station.

11. A load former feed system as claimed by claim 8, wherein the transfer device is comprised of:

a transfer frame spanning the first and second conveyors; and a layer transfer member movably mounted to the transfer frame and movable along the transfer frame to selectively shift a layer from either or both first and second conveyors to the load forming station.

12. A load former feed system as claimed by claim 8, wherein the transfer device is comprised of:

a transfer frame spanning the first and second conveyors;

a layer guide surface on the transfer frame extending across the first and second conveyors; and a layer transfer member movably mounted to the transfer frame and movable along the transfer frame to selectively shift a layer from either or both first and second conveyors to the load forming station.

13. A load former feed system as claimed by claim 8, wherein at least one of the transfer stations and transfer device are selectively movable to an inoperative position separate from at least one of the first and second conveyors to form a manual operator station adjacent the load forming station.

14. A load former feed system as claimed by claim 8, wherein the transfer stations and transfer device are mounted to a mobile frame and are selectively movable to inoperative positions to form manual operator stations adjacent the load forming station;

and further comprising manual transfer tables along the first and second conveyors adjacent the manual operator positioned to receive successive bundles from the first and second conveyors, configured to permit manual shifting of the successive bundles to the load forming station.

15. A load former feed system, comprising:

a conveyor configured to deliver individual bundles to a discharge end;

a bundle transfer station at the discharge end;

a bundle transfer device at the bundle transfer station operable to engage and shift bundles received at the bundle transfer station to a load forming station adjacent the bundle transfer station; and wherein the bundle transfer station and bundle transfer device are movably mounted to a frame and are selectively separable from the conveyor to an inoperative position to form a manual operator station.

16. A load former feed system as claimed by claim 15 further comprising:

a manual transfer table section along the conveyor adjacent the manual operator station positioned to receive successive bundles from the conveyor and configured to permit manual shifting of the successive bundles to the load forming station.

* * * * *